(12) United States Patent
Kim et al.

(10) Patent No.: US 12,540,914 B2
(45) Date of Patent: Feb. 3, 2026

(54) KIT AND METHOD FOR DETECTING CORONAVIRUS

(71) Applicants: Korea University Research and Business Foundation, Seoul (KR); Industry-University Cooperation Foundation Hanyang University ERICA Campus, Ansan-si (KR)

(72) Inventors: Young Keun Kim, Seoul (KR); Ju Hun Lee, Seoul (KR); Bum Chul Park, Seoul (KR); Hyeon Su Park, Seoul (KR); Jeong Ook Soh, Seoul (KR)

(73) Assignees: Korea University Research and Business Foundation, Seoul (KR); Industry-University Cooperation Foundation Hanyang University ERICA Campus, Ansan-si (KR)

( * ) Notice: Subject to any disclaimer, the term of this patent is extended or adjusted under 35 U.S.C. 154(b) by 443 days.

(21) Appl. No.: 17/981,067

(22) Filed: Nov. 4, 2022

(65) Prior Publication Data
US 2023/0273147 A1    Aug. 31, 2023

(30) Foreign Application Priority Data

Dec. 31, 2021  (KR) .......... 10-2021-0194434
Jul. 29, 2022  (KR) .......... 10-2022-0094666

(51) Int. Cl.
*G01N 27/327* (2006.01)
*B82Y 15/00* (2011.01)
*C12Q 1/70* (2006.01)

(52) U.S. Cl.
CPC .......... *G01N 27/3278* (2013.01); *B82Y 15/00* (2013.01); *C12Q 1/701* (2013.01); *G01N 2800/26* (2013.01)

(58) Field of Classification Search
CPC .......... G01N 27/3278; G01N 2800/26; G01N 27/3275–3277; B82Y 15/00; C12Q 1/701
See application file for complete search history.

(56) References Cited

U.S. PATENT DOCUMENTS

| 2011/0171749 A1* | 7/2011 | Alocilja | B82Y 5/00 536/23.1 |
| 2012/0000795 A1* | 1/2012 | Ramaprabhu | B82Y 25/00 205/792 |
| 2023/0340452 A1* | 10/2023 | Wang | C12Q 1/707 |

FOREIGN PATENT DOCUMENTS

| KR | 10-1506048 B1 | 3/2015 |
| KR | 101627289 B1 * | 6/2016 |
| KR | 10-2016-0097881 A | 8/2016 |

OTHER PUBLICATIONS

Chaibun, Thanyarat, et al. "Rapid electrochemical detection of coronavirus SARS-CoV-2." Nature communications 12.1 (2021): pp. 1-10.

(Continued)

*Primary Examiner* — James Lin
*Assistant Examiner* — Vivian A Tran
(74) *Attorney, Agent, or Firm* — NSIP Law

(57) ABSTRACT

Provided are a kit for detecting Coronavirus using magnetic nanoparticles and a method detecting Coronavirus using the same. The kit for detecting Coronavirus includes a reactor having an opening on one side and provided with a sample containing Coronavirus, at least one magnetic nanoparticle part provided in the reactor, a conductive substrate provided to cover the opening of the reactor, and a magnetic field applying part for applying a magnetic field to the reactor, in which the magnetic nanoparticle part includes a magnetic nanoparticle including a core portion made of iron oxide and (Continued)

a shell portion made of gold and provided to surround the core portion, and a primer attached to the shell portion of the magnetic nanoparticle.

12 Claims, 14 Drawing Sheets

Specification includes a Sequence Listing.

(56) References Cited

OTHER PUBLICATIONS

Gu, Zhejia, et al. "Solid-phase PCR based on thermostable, encoded magnetic microspheres for simple, highly sensitive and multiplexed nucleic acid detection." *Sensors and Actuators B: Chemical* 298 (2019): 126953.

Luo, Xiaoteng, et al. "Magnetic particle based electrochemical sensing platform for PCR amplicon detection." *Electrochemistry communications* 12.4 (2010): pp. 531-534.

\* cited by examiner

[FIG. 1]
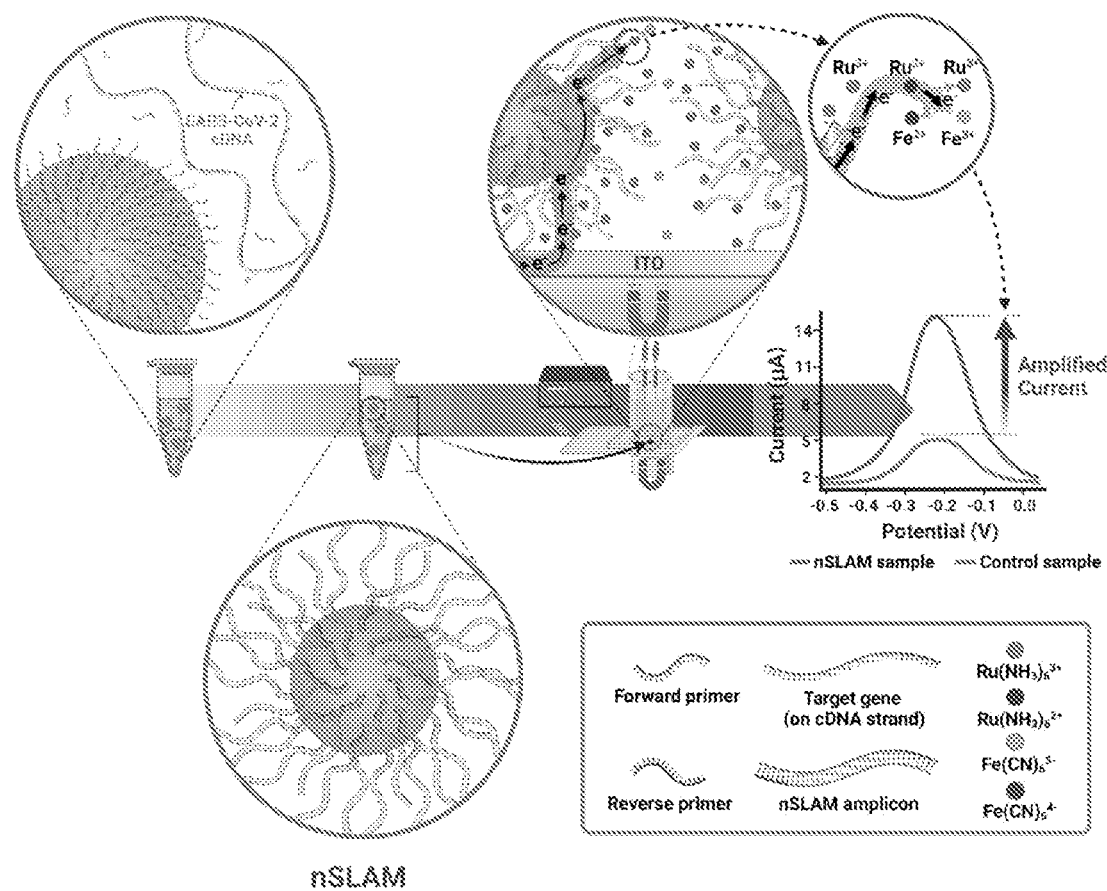

[FIG. 2]
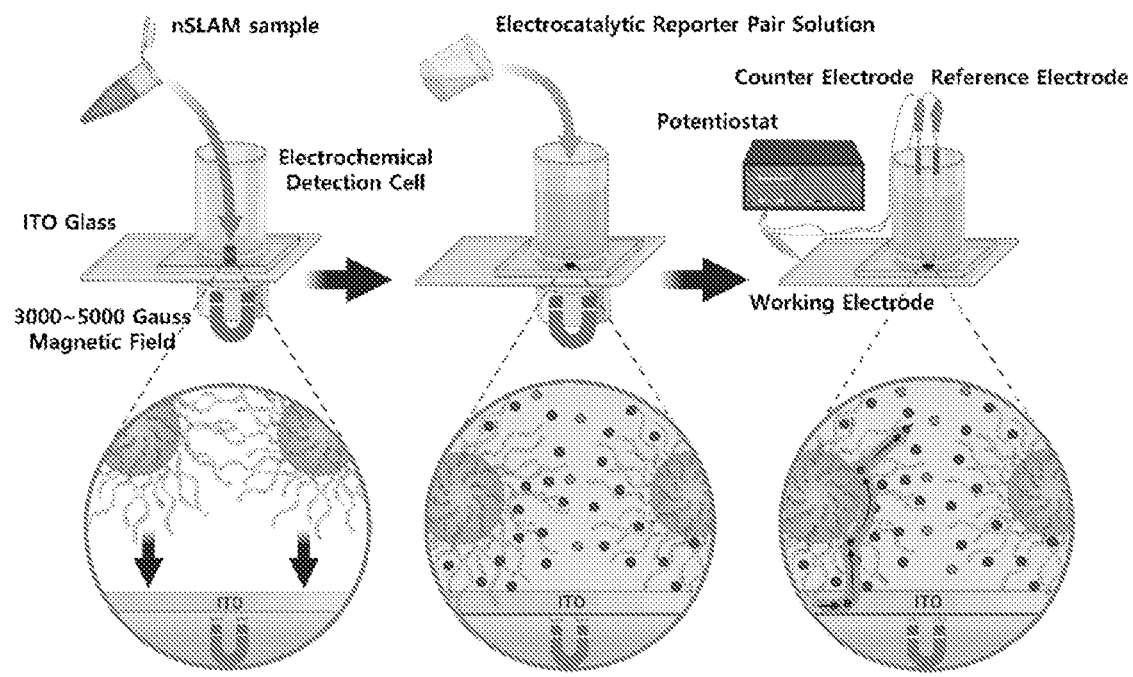
[FIG. 3]
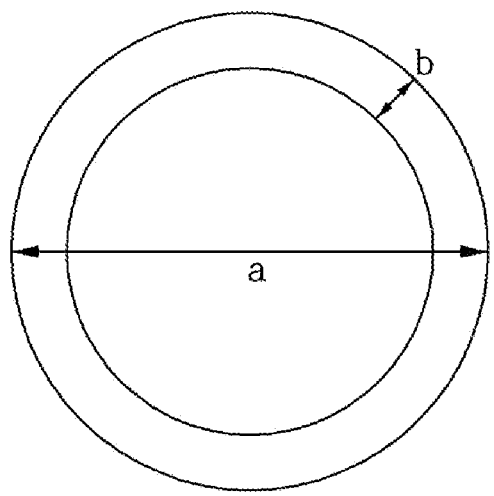

[FIG. 4]
[FIG. 5]
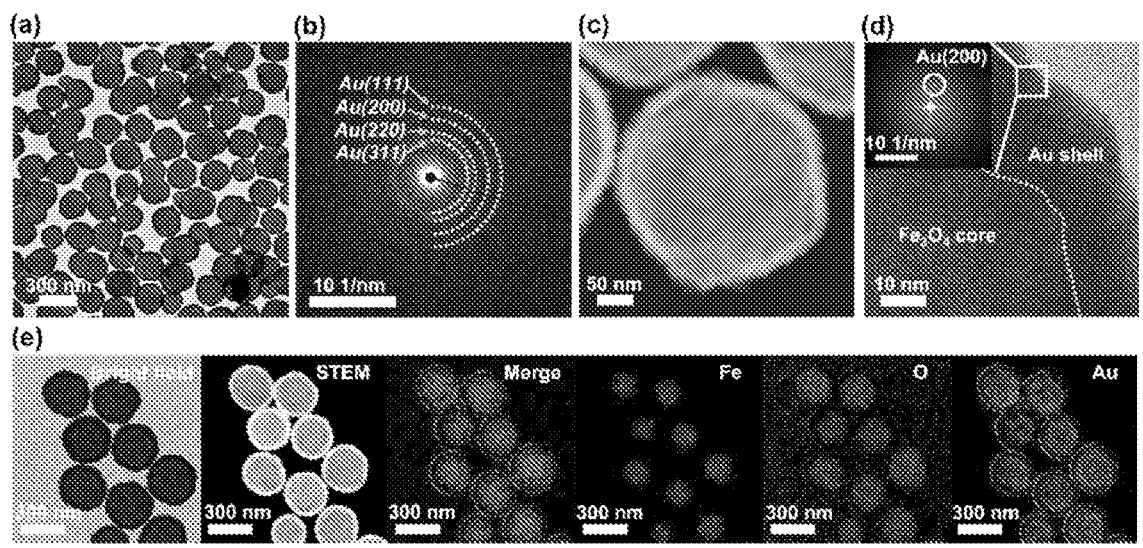

[FIG. 6]
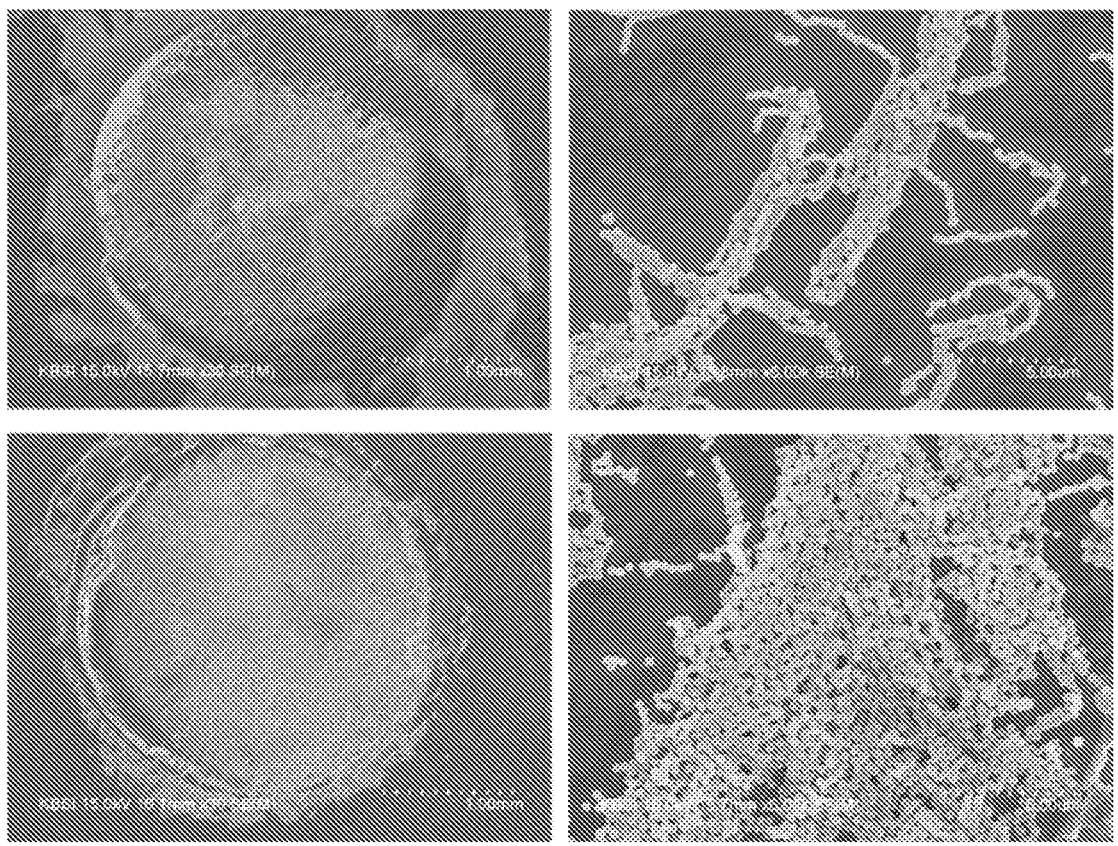

[FIG. 7]
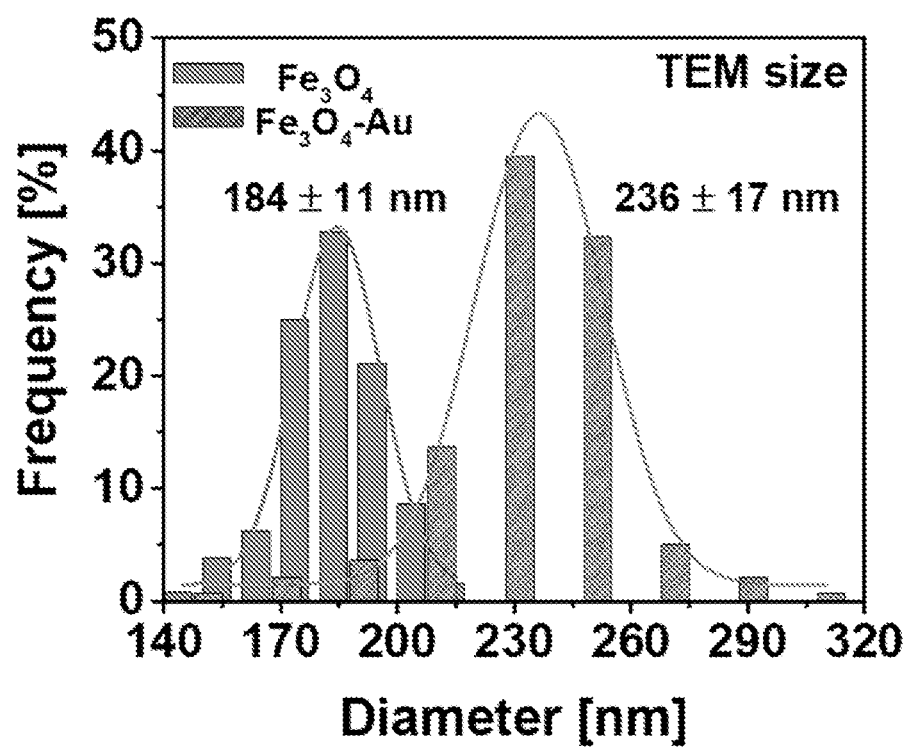

[FIG. 8]
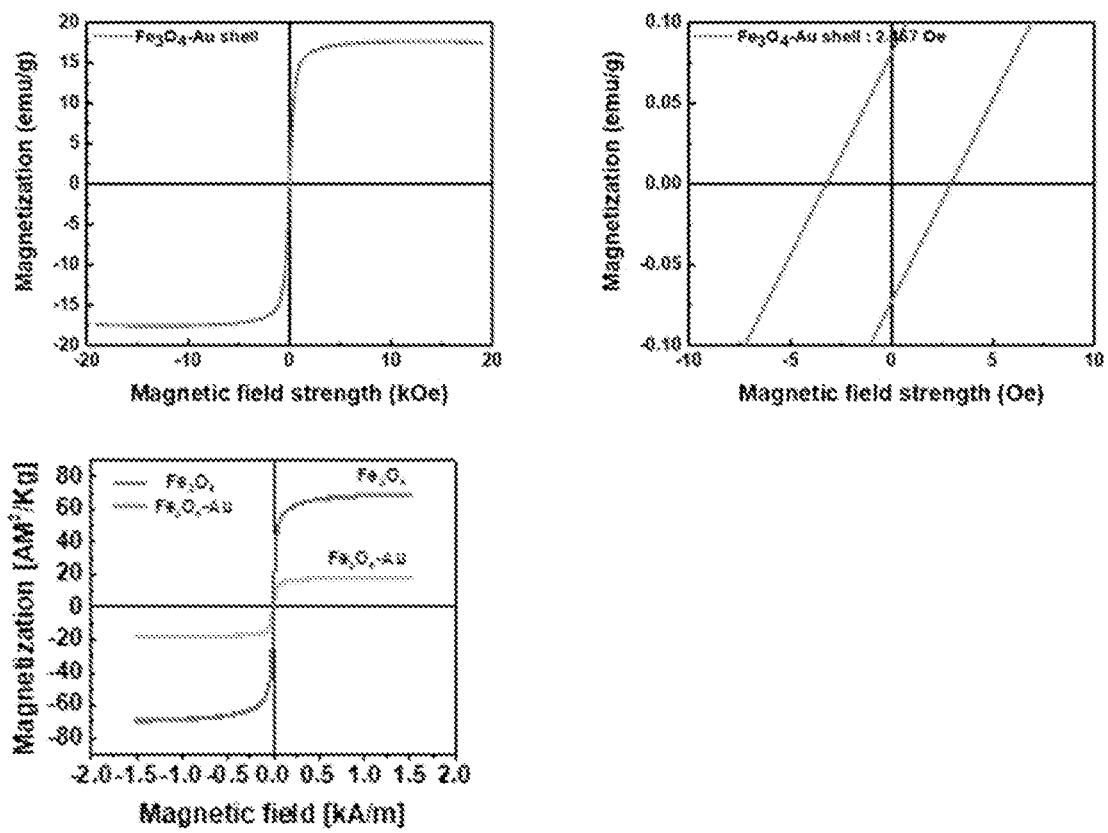

[FIG. 9]
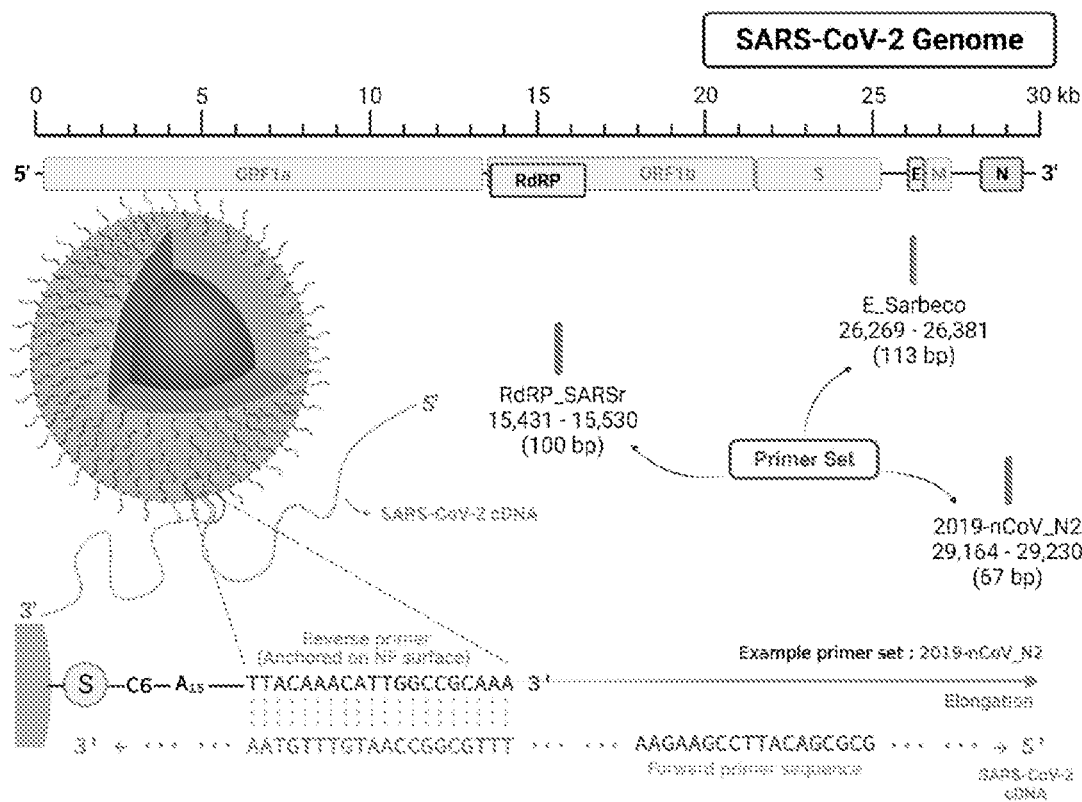

[FIG. 10]

| Producer | Product | Amplification Approach | LoD* (copies/μL) | Cp** Value | Runtime (min) |
|---|---|---|---|---|---|
| LetsGetChecked, Inc. | LetsGetChecked Coronavirus (COVID-19) Test | (multiplex) real-time transcription mediated amplification | ~0.007 | - | - |
| PerkinElmer, Inc. | PerkinElmer New Coronavirus Nucleic Acid Detection Kit | Real-time RT-PCR/pooling | ORF1ab: 0.009 N: 0.03 | ≤40 | 120 |
| Roche Molecular Systems, Inc. | cobas SARS-CoV-Nucleic acid test for use on the cobas Liat System | (multiplex) Real-time RT-PCR | 0.012 | - | 20 |
| Texas Department of State Health Services, Laboratory Services Section | DSHS SARS-CoV-2 Assay | Real-time RT-PCR | 0.02 | ≤35 | - |
| Quest Diagnostics Infectious Disease, Inc. | Quest Diagnostics RC SARS-CoV-2 Assay | Real-time RT-PCR routine (Hologic) | ORF1ab: 0.025 E: 0.032 | - | - |
| Abbott Molecular, Inc. | Alinity m SARS-CoV-2 assay | (multiplex) Real-time RT-PCR | 0.03 | - | ≤117 |
| RIA Laboratories Biological Products Pharmaceutical and Machinery Industry | Diagnostic SARS-CoV-2 Real-Time PCR Kit | (multiplex) Real-time RT-PCR | 0.038 | ≤35 | - |
| Becton, Dickinson & Company (BD) | BioGX SARS-CoV-2 Reagents for BD Max System | (multiplex) Real-time RT-PCR | 0.04 | - | 180 |
| Thermo Fisher Scientific Inc. | TaqPath COVID-19 Pooling Kit | (multiplex) Real-time RT-PCR | 0.05 | - | - |
| Verily Life Sciences | Verily COVID-19 RT-PCR Kit | (multiplex) Real-time RT-PCR | 0.06 | ≤37 | - |
| Poplar Healthcare | Poplar SARS-CoV-2 TMA Pooling Assay | (multiplex) Real-time RT-PCR/pooling | ~0.07 | - | 210 |
| RCA Laboratory Services | GENETWORx Covid-19 Nasal Swab Test | Transcription mediated amplification/Dual kinetic assay | ~0.072 | - | 180 |
| Visose Eurofins Clinical Diagnostics | Visose SARS-CoV-2 assay DTC | Real-time RT-PCR | 0.073 | ≤38 | 1440 |
| Life Technologies Corporation | TaqPath COVID-19 MS2 Combo Kit 2.0 | (multiplex) Real-time RT-PCR | 0.073 | - | - |
| Laboratory Corporation of America (LabCorp) | Pixel by LabCorp COVID-19 Test Home Collection Kit | (single/multiplex) Real-time RT-PCR/pooling | 0.08 | - | - |
| DiaCarta, Inc. | QuantiVirus SARS-CoV-2 Test Kit | (multiplex) single-step real-time RT-PCR | 0.1 | ≤40 | 120 |
| Pro-Lab Diagnostics | Pro-Amp RT SARS-CoV-2 Test | RT-isothermal nucleic acid amplification | 0.125 | - | 60 |
| Color Health, Inc. | Color SARS-CoV-2 RT-LAMP Diagnostic Assay (DTC) | Isothermal nucleic acid amplification (LAMP) | 0.75 | - | - |
| Lucira Health, Inc. | Lucira CHECK-IT COVID-19 Test Kit | RT-LAMP | 0.9 | - | 30 |
| SEASUN BIOMATERIALS, Inc. | AQ-TOP COVID-19 Rapid Detection Kit PLUS | (singleplex) RT-LAMP | 1 | ≤30 | 45 |

[FIG. 11]

| Producer | Product | Amplification Approach | LoD[a] (copies/µL) | Ct[b] Value | Runtime (min) |
|---|---|---|---|---|---|
| Visby Medical, Inc. | Visby Medical COVID-19 | Real-time RT-PCR | 1.112 | - | 30 |
| Helix OpCo LLC (dba Helix) | Helix COVID-19 NGS Test | Amplicon-based next generation sequencing | 1.125 | - | >80 |
| Exact Sciences Laboratories | SARS-CoV-2 (N gene detection) Test | (biplex) Real-time RT-PCR | 1.2 | ≤Ct≤40 | - |
| Omnipathology Solutions Medical Corporation | Omni COVID-19 Assay by RT-PCR | (multiplex) Real-time RT-PCR | 1.25 | <40 | - |
| Applied DNA Sciences, Inc. | Linea COVID-19 Assay Kit | Real-time RT-PCR | 1.25 | <40 | 80 |
| Cue Health Inc. | Cue COVID-19 Test | Isothermal nucleic acid amplification | 1.3 | - | 25 |
| ResearchDx, Inc., DBA Pacific Diagnostics | PacificDx Covid-19 | Real-time RT-PCR | 1.6 | <40 | - |
| Biomeme, Inc. | Biomeme SARS-CoV-2 Real-Time RT-PCR Test | (multiplex) Real-time RT-PCR | 1.8 | ≤40 | 80 |
| GK Pharmaceuticals Contract Manufacturing Operations | GK ACCU-RIGHT SARS-CoV-2 RT-PCR KIT | Real-time RT-PCR | 2 | <40 | - |
| Vela Operations Singapore Pte Ltd. | ViroKey SARS-CoV-2 RT-PCR Test | (multiplex) Real-Time RT-PCR | 2.25 | 10<Ct<40 | 240 |
| Gravity Diagnostics, LLC | Gravity Diagnostics COVID-19 Assay | (biplex) Real-time RT-PCR | 2.4 | <35 | - |
| GenoMatrix, Inc. | NeoPlex COVID-19 Detection Kit | (multiplex) Real-time RT-PCR | 2.5 | ≤40 | 180 |
| TBS Co., Ltd (Bio TBS) | COVID-19 RT-PCR Peptide Nucleic Acid (PNA) kit | Real-time RT-PCR | 2.524 | ≤40 | - |
| ScienCell Research Laboratories | ScienCell SARS-CoV-2 Coronavirus Real-time RT-PCR (RT-qPCR) Detection Kit | Real-time RT-PCR | 3.16 | <40 | 75 |
| BillionToOne, Inc. | qSanger-COVID-19 Assay | Sanger sequencing-based test | 3.2 | - | - |
| KogeneBiotech Co., Ltd. | PowerChek 2019-nCoV Real-time PCR Kit | (multiplex) Real-time RT-PCR | 4 | ≤37 | 360 |
| Seegene, Inc. | Allplex 2019-nCoV Assay | (multiplex) Real-time RT-PCR | 4.167 | ≤40 | 240 |
| Co-Diagnostics, Inc. | Logix Smart Coronavirus Disease 2019 (COVID-19) kit | (multiplex) Single-step real-time RT-PCR | 4.29 | ≤42 | 60-90 |
| Luminex Molecular Diagnostics, Inc. | NxTAG CoV Extended Panel Assay | (multiplex) Real-time RT-PCR | 5 | - | - |
| Genetron, Inc. | GenePro SARS-CoV-2 Test | (multiplex) Real-time RT-PCR | 5.55 | <31 | 110 |
| INNO Diagnostics Reference Laboratory, Ponce Medical School | PRISM SARS-CoV-2 RT-PCR Test (Authorized by HHS/OASH) | Real-time RT-PCR | 6 | ≤40 | - |

[FIG. 12]
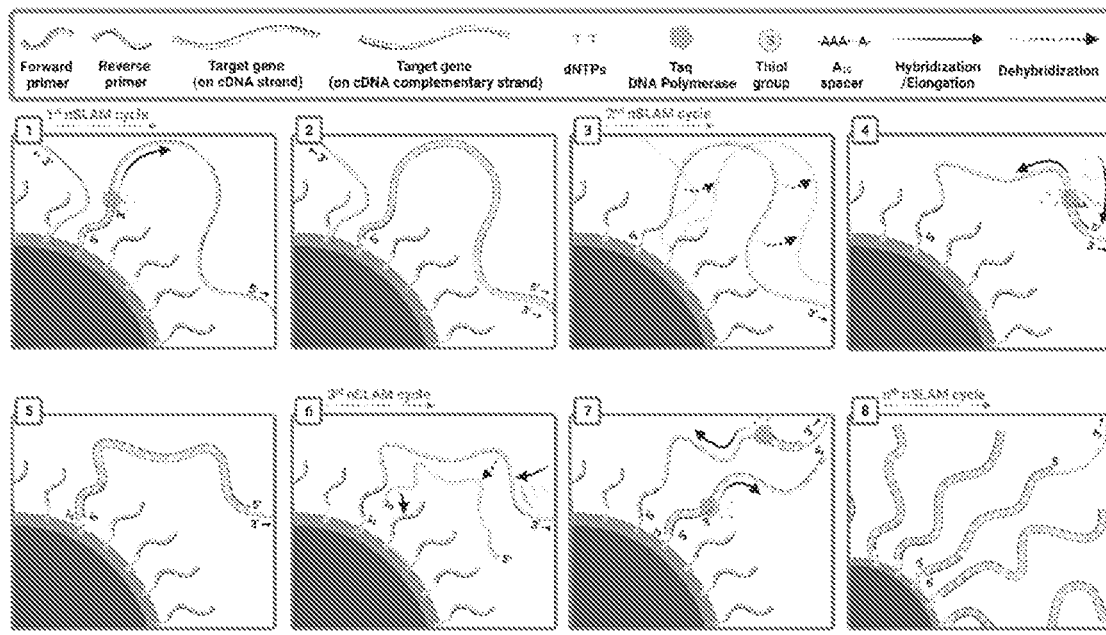
[FIG. 13]
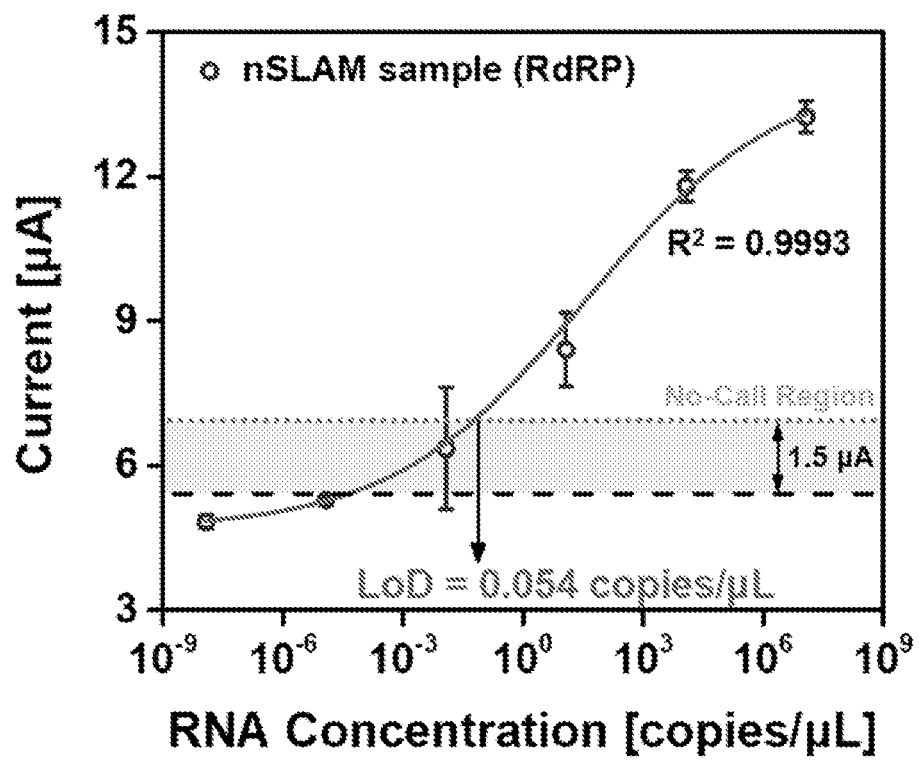

[FIG. 14]
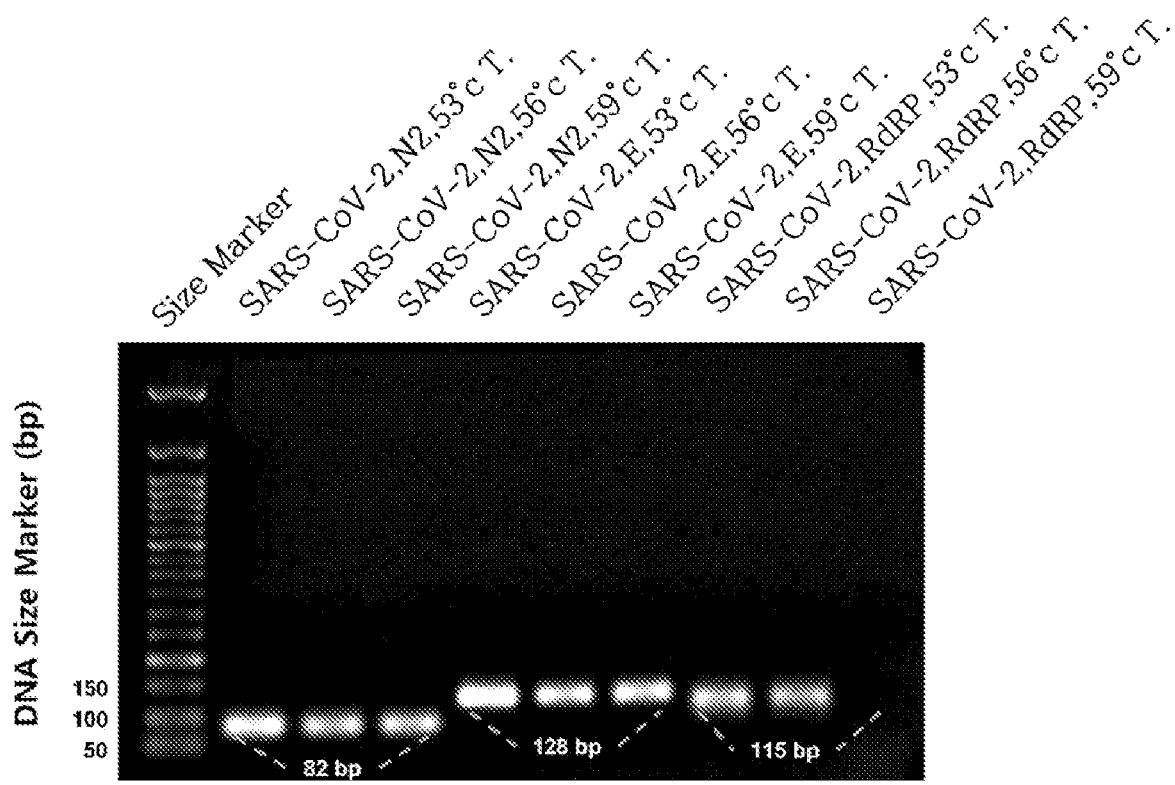
[FIG. 15]
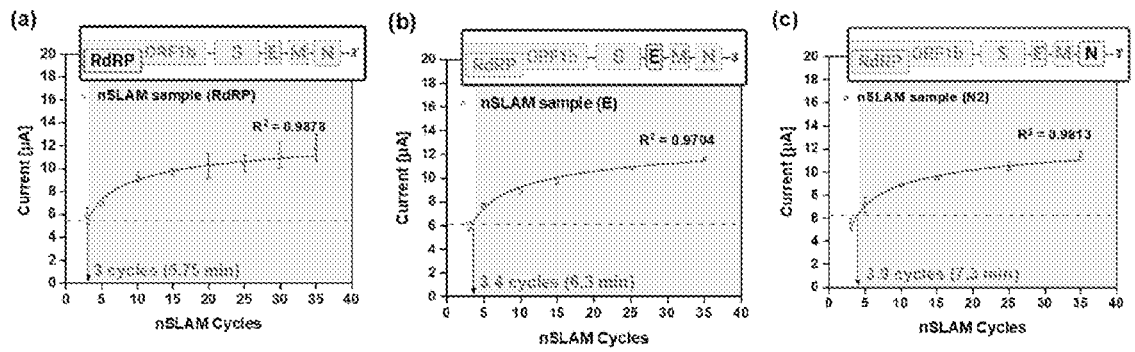

[FIG. 16]
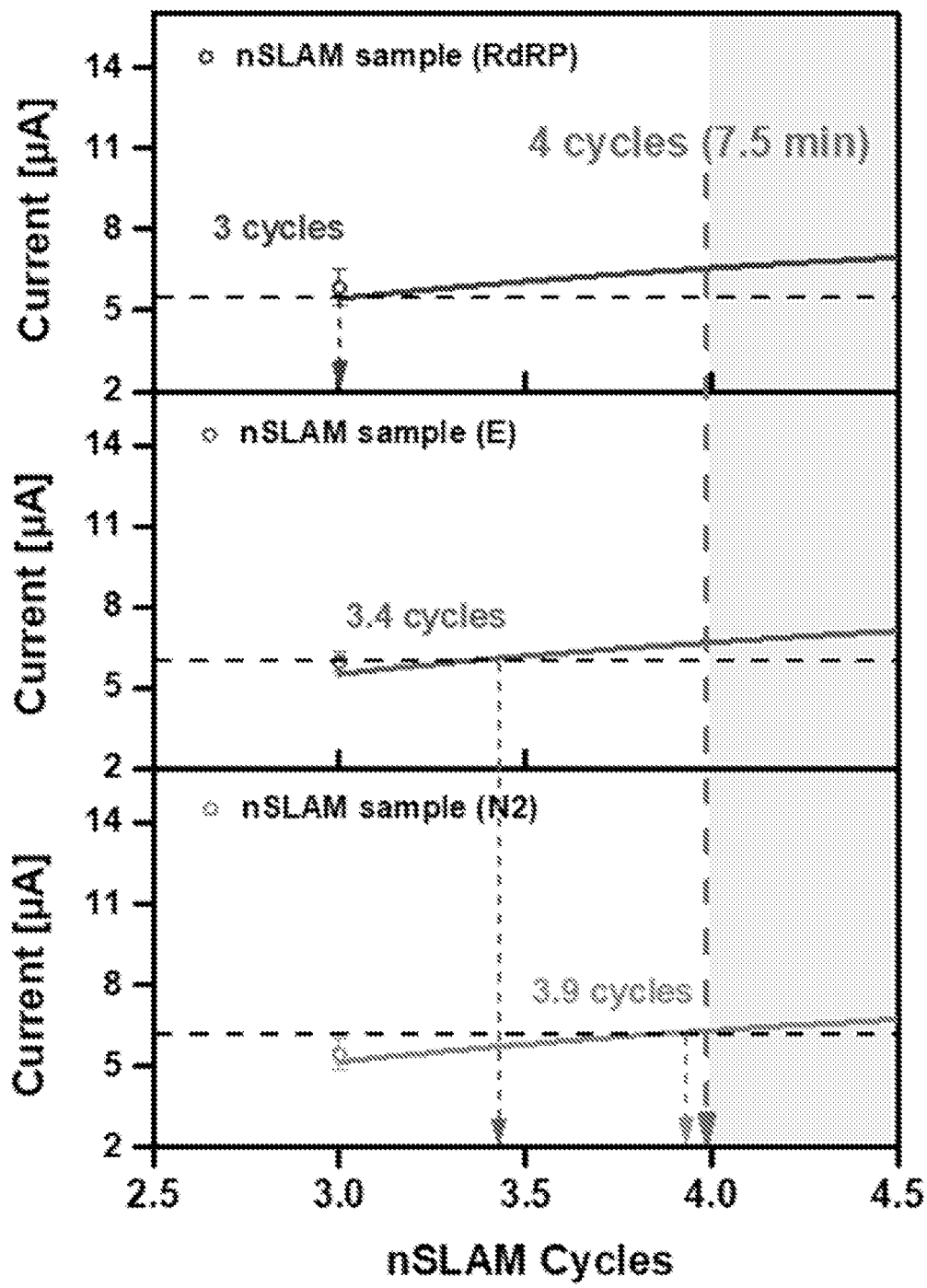

[FIG. 17]
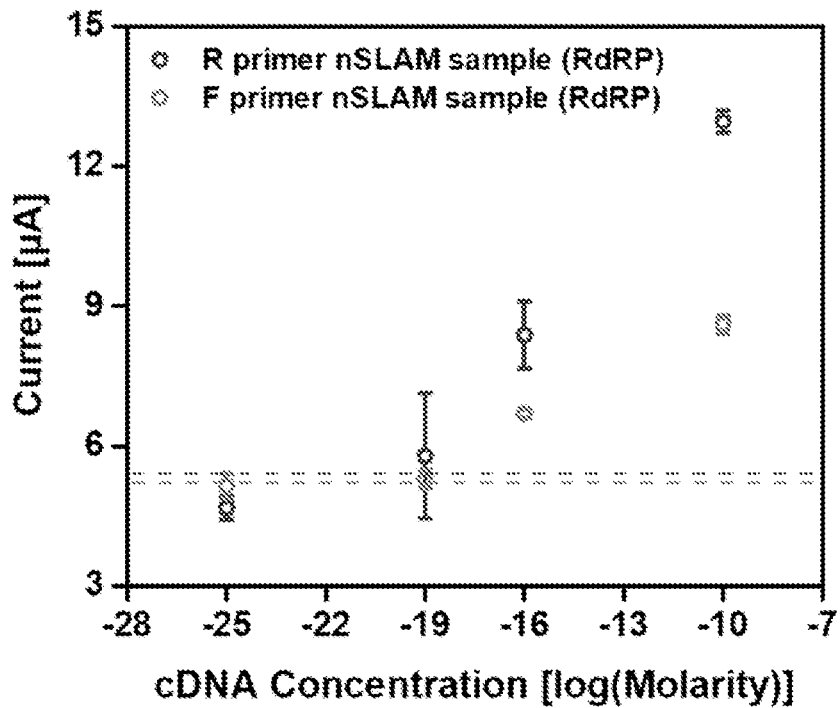
[FIG. 18]
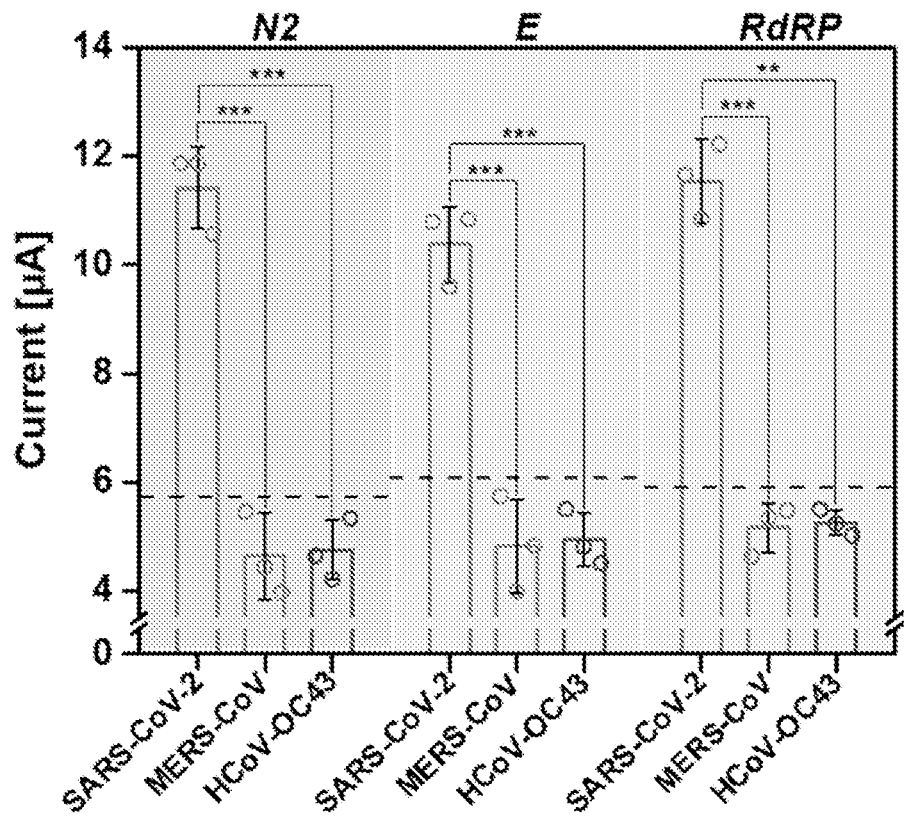

[FIG. 19]
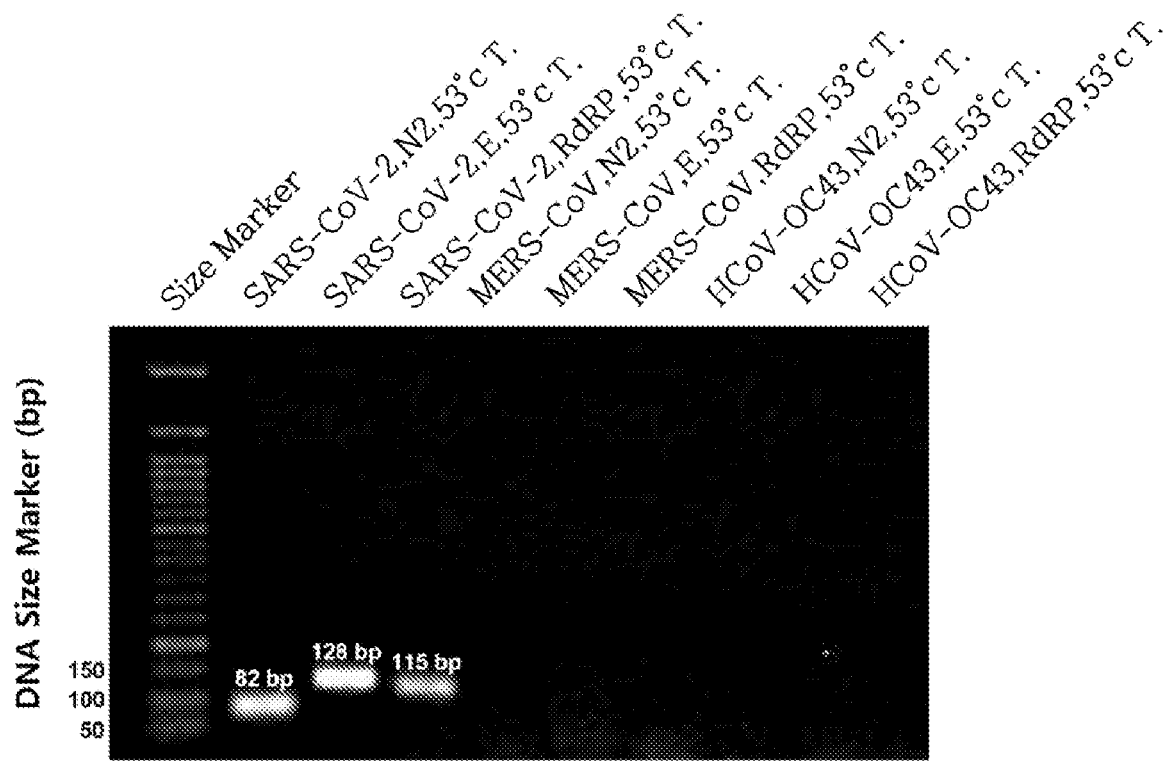

KIT AND METHOD FOR DETECTING CORONAVIRUS

CROSS-REFERENCE TO RELATED APPLICATIONS

This application claims priority to and the benefit of Korean Patent Application No. 10-2021-0194434 filed on Dec. 31, 2021 and 10-2022-0094666 filed on Jul. 29, 2022, in the Korean Intellectual Property Office, the entire contents of which are incorporated herein by reference.

INCORPORATION-BY-REFERENCE OF MATERIAL SUBMITTED BY U.S.P.T.O. EFS-WEB

This application contains a Sequence Listing, which is being submitted in computer readable form via the United States Patent and Trademark Office Patent Center and which is hereby incorporated by reference in its entirety for all purposes. The XML file submitted herewith, which is named as "MISC20230321_0181940019_SEQLISTING" and is created on May 19, 2023, contains a 17.0 KB file.

TECHNICAL FIELD

The present disclosure relates to a kit for detecting Coronavirus and a method for detecting Coronavirus, and more particularly, a kit for detecting Coronavirus capable of effectively detecting a low concentration of Coronavirus in a short time with high sensitivity and a method for detecting Coronavirus.

BACKGROUND ART

Molecular diagnosis diagnoses a basis of disease such as DNA or RNA, and has been used in various fields, such as infectious diseases, cancer diagnosis, genetic diseases, and customized diagnosis. As a representative molecular diagnostic technology, there is a polymerase chain reaction (PCR) technology that amplifies DNA within a short time.

A PCR-based molecular diagnostic technology has advantages for specific cancers and specific viral infectious diseases with high diagnostic accuracy and thus has been used as a gold standard. Among them, real-time PCR, which is expensive, but has the highest accuracy, is mainly used, and a lot of cheaper conventional PCRs have been used.

Coronavirus refers to viruses belonging to Coronaviridae having single-stranded RNA as a genome, and is found not only in birds but also in various mammals including humans. Coronavirus have various species, and is known to cause both respiratory and digestive infectious diseases depending on the nature and a host of the virus.

In humans, Coronavirus has been a problem as a causative virus of Severe Acute Respiratory Syndrome (SARS), which was a worldwide problem in 2003 and Middle East Respiratory Syndrome Coronavirus (MERS) in 2015. Recently, Coronavirus has attracted attention as SARS-CoV-2, the pathogen of Coronavirus Disease-19 (COVID-19), which originated in Wuhan, China and is spreading around the world.

Coronavirus infection shows high prevalence and is highly contagious even in an asymptomatic state in the early stages of the onset, so that there is a high possibility of causing mass infection. Currently, therapeutic agents and vaccines are being developed around the world, but cures have not been established, and thus, the best measure is to detect infected people early and prevent mass infection.

Therefore, PCR technology has been used as one of technologies capable of quickly and accurately diagnosing whether a plurality of test subjects is infected with Coronavirus. On the other hand, such a PCR technology has disadvantages of inducing a sufficient polymerase chain reaction and requiring expensive equipment, costs, and a lot of time, in order to maintain high accuracy. In addition, there are many difficulties in detecting a base sequence with a short lifespan and a low concentration (1 fM or less).

SUMMARY OF THE INVENTION

The present disclosure has been made in an effort to provide a kit for detecting Coronavirus and a method for detecting Coronavirus capable of efficiently detecting a low concentration of Coronavirus within a short time with high sensitivity.

The present disclosure has also been made in an effort to provide a kit for detecting Coronavirus and a method for detecting Coronavirus capable of reducing the cycle number of PCR to dramatically shorten the time required for diagnosis and increase efficiency by using novel magnetic nanoparticles.

According to one aspect of the present disclosure, embodiments of the present disclosure provide a kit for detecting Coronavirus and a method for detecting Coronavirus.

An embodiment of the present disclosure provides a kit for detecting Coronavirus including magnetic nanoparticles and primers attached to the surface of the magnetic nanoparticles, in which the primer may form an amplified product through a polymerase chain reaction with the Coronavirus, and the magnetic nanoparticles collected by the formation of the amplified product may detect the Coronavirus by amplifying an electrochemical signal by a repeated potential application.

In an embodiment, the electrochemical signal may measure a change in current value by applying DC or AC power.

In an embodiment, the primer may include any one or more of SEQ ID NO: 1 to SEQ ID NO: 6.

In an embodiment, the Coronavirus may be any one or more of HCoV-229E, HCoV-OC43, SARS-CoV, HCoV-NL63, HCoV-HKU1, MERS-CoV, and COVID-19 (SARS-CoV-2).

In an embodiment, the magnetic nanoparticle may include a magnetic nanoparticle consisting of a core portion made of iron oxide and a shell portion made of gold provided to surround the core portion, and the primer may be modified with a compound having any one of a thiol group and an amino group at a 5'-end.

In an embodiment, an average diameter of the magnetic nanoparticle may be provided with a first length and an average thickness of the shell portion may be provided with a second length, in which the second length may be 0.09 to 0.15 times greater than the first length.

In an embodiment, an average diameter of the magnetic nanoparticle may be provided with a first length and an average thickness of the shell portion may be provided with a second length, in which the first length may be 170 nm to 300 nm and the second length may be 15 nm to 40 nm.

In an embodiment, the magnetic nanoparticle may be prepared by preparing a core portion made of iron oxide, providing a buffer portion containing silicon on the surface of the core portion, and functionalizing an outer surface of the buffer portion with at least one of an amino group (—NH₂) and a thiol group (—SH) and then forming a shell portion containing gold.

The kit for detecting Coronavirus may further include a reactor having an opening on one side; a conductive substrate provided to cover the opening of the reactor; a first electrode and a second electrode provided in the reactor; a magnetic field applying part for applying a magnetic field to the reactor; and an electrochemical signal measuring part for measuring an electrochemical signal by using the conductive substrate and the first and second electrodes as a three-electrode module.

In an embodiment, the magnetic nanoparticles and the amplified products formed on the surface of the magnetic nanoparticles may be provided in the reactor, and the first electrode may include a reference electrode, the conductive substrate may include a working electrode, and the second electrode may include a counter electrode controlling an electron balance generated from the reference electrode and the working electrode, which may be performed as a three-electrode module, in which the first or second electrode may consist of any one or more of gold (Au), cobalt (Co), platinum (Pt), silver (Ag), carbon nanotube, graphene, and carbon, and the conductive substrate may include any one or more of indium tin oxide (ITO), ZnO, $SnO_2$, $In_2O_3$, $CdSnO_4$, a carbon substrate material including carbon nanotubes, a fluorine-doped tin oxide (FTO) added with fluorine, and an aluminum doped zinc oxide (AZO) added with aluminum.

In an embodiment, the electrochemical signal measuring part may include any one or more of a differential pulse voltammeter (DPV), an anodic stripping voltammetry (ASV), a chronoamperometry (CA), a cyclic voltammetry, a square wave voltammetry (SWV), and an impedance meter.

In an embodiment, the magnetic field applying part may reversibly apply a magnetic field into the reactor one or more times with the conductive substrate interposed therebetween, and the magnetic field applying part may move the magnetic nanoparticles toward the opening of the reactor and control the degree of moving the magnetic nanoparticles.

According to another aspect of the present disclosure, there is provided a method for detecting Coronavirus including the steps of: preparing magnetic nanoparticles with primers attached on the surface thereof; obtaining magnetic nanoparticles having amplified products on the surface by performing a polymerase chain reaction (PCR) by adding the magnetic nanoparticles with the primers attached to the surface to a sample containing Coronavirus; adding the magnetic nanoparticles with the amplified products on the surface in a reactor provided with an opening, covering the opening with a conductive substrate, and applying a magnetic field into the reactor from one side of the conductive substrate under a first condition; adding metal ions including any one or more of ruthenium (Ru), iron (Fe), silver (Ag), copper (Cu), nickel (Ni), cadmium (Cd) and zinc (Zn) into the reactor and then applying the magnetic field under a second condition; and providing first and second electrodes in the reactor, and measuring an electrochemical signal using the first and second electrodes and the conductive substrate together.

In an embodiment, the preparing of the magnetic nanoparticles with primers attached on the surface thereof may include preparing a core portion made of iron oxide, providing a buffer portion containing silicon on the surface of the core portion to prepare pre-nanoparticles, preparing magnetic nanoparticles by functionalizing an outer surface of the buffer portion with at least one of an amino group (—NH₂) and a thiol group (—SH) and forming a shell portion containing gold, and mixing primers modified with a compound having any one of a thiol group and an amino group (—NH₂) at the 5' end with the magnetic nanoparticles and performing salt aging.

In an embodiment, the salt aging may include adding and mixing the magnetic nanoparticles and the primers to a stirrer, and then adding a first solution and a second solution in a volume ratio of 5:1 to 30:1 in the stirrer a plurality of times and sonicating the mixture, in which the first solution may be provided by mixing a sodium chloride solution, a phosphate buffered saline, and ultrapure water, and the second solution may be provided by mixing a phosphate buffered saline, sodium dodecyl sulfate and ultrapure water.

In an embodiment, the primer may include any one or more of SEQ ID NO: 1 to SEQ ID NO: 6.

In an embodiment, the Coronavirus may be any one or more of HCoV-229E, HCoV-OC43, SARS-CoV, HCoV-NL63, HCoV-HKU1, MERS-CoV, and COVID-19 (SARS-CoV-2).

In an embodiment, in the measuring of the electrochemical signal, the first electrode may include a reference electrode, the conductive substrate may include a working electrode, and the second electrode may include a counter electrode controlling an electron balance generated from the reference electrode and the working electrode, which may be performed as a three-electrode module, in which the first or second electrode may consist of any one or more of gold (Au), cobalt (Co), platinum (Pt), silver (Ag), carbon nanotube, graphene, and carbon, and the conductive substrate may include any one or more of indium tin oxide (ITO), ZnO, $SnO_2$, $In_2O_3$, $CdSnO_4$, a carbon substrate material including carbon nanotubes, a fluorine-doped tin oxide (FTO) added with fluorine, and an aluminum doped zinc oxide (AZO) added with aluminum.

In an embodiment, the measuring of the electrochemical signal may include any one or more of a differential pulse voltammeter (DPV), an anodic stripping voltammetry (ASV), a chronoamperometry (CA), a cyclic voltammetry, a square wave voltammetry (SWV), and an impedance meter.

In an embodiment, the first electrode may be a reference electrode containing Ag/AgCl, the second electrode may be a counter electrode containing Pt, and the conductive substrate may be a working electrode containing ITO, which may be performed as a three-electrode module, and the measuring of the electrochemical signal may include a differential pulse voltammetry (DPV).

According to the present disclosure, it is possible to provide a kit and a method for detecting Coronavirus capable of detecting Coronavirus with high sensitivity by variously controlling shapes and the like of magnetic nanoparticles.

Further, it is possible to provide a kit and a method for detecting Coronavirus capable of reducing the number of PCR cycles and rapidly detecting Coronavirus with high accuracy.

In addition, it is possible to provide a kit and a method for detecting Coronavirus capable of efficiently detecting Coronavirus even at a low concentration by modifying and using primers.

BRIEF DESCRIPTION OF THE DRAWINGS

FIG. 1 is a diagram schematically illustrating an overall process of detecting Coronavirus using a kit for detecting Coronavirus according to an embodiment of the present disclosure.

FIG. 2 is a diagram schematically illustrating a kit for detecting Coronavirus of the present disclosure.

FIG. 3 is a diagram illustrating a magnetic nanoparticle of the present disclosure.

FIG. 4 is a diagram schematically illustrating a method of manufacturing a magnetic nanoparticle with primers attached on the surface according to an embodiment of the present disclosure.

FIG. 5 is a schematic diagram and a TEM image of magnetic nanoparticles of Preparation Example 3.

FIG. 6 is an SEM image of the magnetic nanoparticles of Preparation Example 3.

FIG. 7 is a graph showing sizes of the magnetic nanoparticles of Preparation Example 3 and the iron oxide nanoparticles (core) according to Preparation Example 1.

FIG. 8 is a result of confirming magnetic field characteristics of the magnetic nanoparticles of Preparation Example 3.

FIG. 9 is a diagram illustrating information about N, E, and RdRP sequences of COVID-19 virus used in the present disclosure.

FIGS. 10 and 11 illustrate data on RT-PCR-based COVID-19 diagnostic kits urgently approved by the FDA.

FIG. 12 is a schematic diagram illustrating a process of performing nSLAM according to an embodiment of the present disclosure.

FIG. 13 is an experimental result for confirming a minimum detectable concentration of Coronavirus using an embodiment of the present disclosure.

FIG. 14 illustrates an experimental result for finding and optimal annealing temperature during a PCR process.

FIGS. 15 and 16 illustrate experimental results for confirming minimum detectable PCR cycles of Coronavirus using an embodiment of the present disclosure.

FIG. 17 illustrates an experimental result for confirming the efficiency of using reverse primers according to an embodiment of the present disclosure.

FIGS. 18 and 19 illustrate experimental results for confirming that an embodiment of the present disclosure has selectivity for SARS-CoV-2 virus.

DETAILED DESCRIPTION

Details of other exemplary embodiments will be included in the detailed description and the accompanying drawings.

Advantages and features of the present disclosure, and methods for accomplishing the same will be more clearly understood from exemplary embodiments to be described below in detail with reference to the accompanying drawings. However, the present disclosure is not limited to embodiments to be disclosed below, but may be implemented in a variety of different forms. Unless otherwise specified in the description below, all numbers, values and/or expressions expressing components, reaction conditions, and contents of components in the present disclosure are approximations which reflect various uncertainties in measurements generated to obtain these values among other things essentially different from these numbers, and thus, in all cases, it is to be understood as being modified by the term "about". Further, when numerical ranges are disclosed in this description, these ranges are continuous and include all values from a minimum value to a maximum value of the range, unless otherwise indicated. Furthermore, when such ranges refer to integers, all integers including from the minimum to the maximum are included, unless otherwise indicated.

Further, in the present disclosure, when a range is disclosed for variables, the variables will be understood to include all values within the disclosed range, including disclosed endpoints of the range. For example, it will be understood that a range of "5 to 10" includes nay lower range such as 6 to 10, 7 to 10, 6 to 9, and 7 to 9 as well as values 5, 6, 7, 8, 9, and 10, and includes any value between integers that fall within the disclosed range, such as 5.5, 6.5, 7.5, 5.5 to 8.5 and 6.5 to 9, etc. For example, it will be understood that a range of "10% to 30%" includes any lower range such as 10% to 15%, 12% to 18%, and 20% to 30% as well as all integers including values of 10%, 11%, 12%, 13%, etc. and up to 30%, and includes any value between integers that fall within the disclosed range, such as 10.5%, 15.5%, 25.5%, etc.

FIG. 1 is a diagram schematically illustrating an overall process of detecting Coronavirus using a kit for detecting Coronavirus according to an embodiment of the present disclosure.

FIG. 2 is a diagram schematically illustrating a kit for detecting Coronavirus of the present disclosure. FIG. 3 is a diagram illustrating a magnetic nanoparticle of the present disclosure. FIG. 4 is a diagram schematically illustrating a method of manufacturing a magnetic nanoparticle with primers attached on the surface according to an embodiment of the present disclosure.

Referring to FIGS. 2 to 4, an embodiment of the present disclosure is a kit for detecting Coronavirus. The kit for detecting Coronavirus includes magnetic nanoparticles and primers attached on the surface of the magnetic nanoparticles. The primer forms an amplified product through a polymerase chain reaction (PCR) with the Coronavirus, and the magnetic nanoparticles in which the amplified product is formed have an electrochemical signal amplified by repeated potential application to detect the Coronavirus. The electrochemical signal may measure a change in a current value by applying DC or AC power. The magnetic nanoparticle 100 may include a core portion made of iron oxide and a shell portion made of gold to surround the core portion.

For example, the kit for detecting Coronavirus according to the present embodiment may detect the Coronavirus by an electrochemical signal, wherein in the electrochemical signal, an initial signal measured first and a measurement signal obtained by repeatedly applying an electric potential are gradually increased. That is, even when the initial signal is too low not to be easily measured, the Coronavirus can be measured with high sensitivity by repeatedly increasing the measurement signal.

In the present disclosure, the terms "target nucleic acid", "single target base sequence", and "specific single base sequence" refer to a nucleic acid molecule to be amplified by the method according to the present disclosure. The type of nucleic acid may be deoxyribonucleotide (DNA), ribonucleotide (RNA), and a mixture or combination thereof. Bases constituting the nucleic acid are naturally occurring nucleotides, for example, guanine (G), adenine (A), thymine (T), cytosine (C), and uracil (U), but may contain other natural and artificial modified bases. The term "modified base" refers to a base in which five nucleotides of guanine, adenine, thymine, cytosine, and uracil have been chemically modified. In the present disclosure, the target nucleic acid, the single target base sequence, and the specific single base sequence need to be single-stranded for amplification, but a nucleic acid that forms a double strand or higher-order structure may also be converted and used into a single strand by heat denaturation, alkali denaturation treatment, etc. The target nucleic acid, the single target base sequence, and the specific single base sequence of the present disclosure also include aspects in which such denaturation treatment is added. In addition, cDNAs prepared by reverse transcription reaction using RNA as a template is included.

As used herein, the term "sample" refers to a mixture considered to include a target nucleic acid to be detected, a single target base sequence, and a specific single base sequence. The sample may be derived from a living body including a human (e.g., blood, saliva, body fluid, body tissue, etc.), an environment (e.g., soil, seawater, environmental water (hot spring water, bath water, cooling tower water, etc.)), or an artificial or natural product (e.g., processed foods such as bread, fermented foods such as yogurt, or cultivated plants such as rice and wheat, microorganisms, viruses) and may generally use those that are subjected to a nucleic acid extraction operation. If necessary, a nucleic acid purification process may be added.

The kit for detecting Coronavirus according to this embodiment includes a reactor having an opening on one side; a conductive substrate provided to cover the opening of the reactor; a first electrode and a second electrode provided in the reactor; a magnetic field applying part for applying a magnetic field to the reactor; and an electrochemical signal measuring part for measuring an electrochemical signal by using the conductive substrate and the first and second electrodes as a three-electrode module.

The magnetic nanoparticle mean a particle shape including a core portion made of iron oxide and a shell portion made of gold, and the magnetic nanoparticle part means a shape in which primers are attached onto the surface of the magnetic nanoparticle. In addition, an amplified product refers to a result obtained after performing the polymerase chain reaction, and the amplified product may be performed in the primers of the magnetic nanoparticle part and collected on the surface of the magnetic nanoparticle.

The magnetic nanoparticle part may be provided in the reactor after PCR amplification reaction is performed. The opening, for example, one or more holes, may be provided in a lower side of the reactor, and the opening is blocked by the conductive substrate, so that the magnetic nanoparticle part provided in the reactor is not discharged to the outside. The magnetic field applying part is provided on the outside of the conductive substrate, and the magnetic field applying part may move the magnetic nanoparticle part toward the opening of the reactor and controls the degree of movement to improve the nucleic acid detection efficiency.

Generally, in a process of detecting nucleic acids, Coronavirus, and the like using PCR technology, there are disadvantages of inducing a sufficient polymerase chain reaction and requiring expensive equipment, costs, and a lot of time, in order to maintain high accuracy. In addition, there are a lot of difficulties to detect a base sequence in which the life of the amplified product is short and the concentration contained in the sample is low (approximately, 1 fM or less). Therefore, there is a problem in that a nanostructure including a microelectrode, which is studied to induce the interaction between an electrode that has a direct influence and a target base sequence has low efficiency.

In addition, in the case of a functional metal nanoparticle-based fluorescence or electrical signal detection technology used together with conventional PCR technology, there is a problem in that after the polymerase chain reaction, a post-treatment process for the particles is involved, and in a process of creating an environment for the particles to react specifically with the target base sequence, the detection efficiency is lowered, and the probability of causing a detection error is high.

In an embodiment of the present disclosure, after the magnetic nanoparticle is synthesized, a nucleotide sequence (forward or reverse primer) that serves to initiate an amplification reaction for a single target nucleotide sequence related to a specific disease is attached to the surface of the magnetic nanoparticle using a thiol group to be dispersed in an aqueous solution, thereby improving process efficiency. In addition, a current peak that gradually increases at 0.25 V is measured by adsorbing ruthenium ions to the base sequence to provide an ultra-sensitive disease detection system that can be measured even in a concentration a M of the target base sequence and an area in a concentration range below the concentration.

In addition, the kit for detecting Coronavirus according to the embodiment has improved accuracy despite remarkably reducing repetitive cycles in the PCR, and may reduce the PCR process to less than 10 minutes, thereby significantly shortening the time taken for the detection step.

The Coronavirus may be any one or more of HCoV-229E, HCoV-OC43, SARS-CoV, HCoV-NL63, HCoV-HKU1, MERS-CoV, and COVID-19 (SARS-CoV-2).

The primer may include any one or more of SEQ ID NO: 7 to SEQ ID NO: 12. The primer may be used by modifying the primer into the following Chemical Formula 1 having a thiol group at a 5'-end of the reverse primer using Chemical Formula 1 below. The 5' end of the reverse primer may also be modified with an amino group in addition to the thiol group.

[Chemical Formula 1]

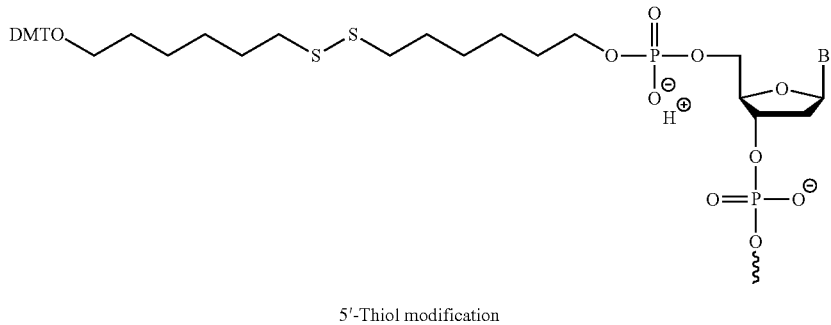

5'-Thiol modification

Specifically, the primer may be used by modifying the primer using a thiol modifier C6 S—S(O-Dimethoxytrityl-hexyl-dithiohexyl-phosphate), which is a compound having a thiol functional group, and more specifically, the primer may be used by further adding and attaching a spacer consisting of 5 to 30 adenine base sequences A to the thiol modifier C6 S—S. The spacer may prevent spatial interference between neighboring primers when the primer attached to the surface of the magnetic nanoparticles performs the polymerase chain reaction, and improves the mobility of the primer to improve the efficiency of the polymerase chain reaction. On the other hand, the adenine sequences may be 5 to 30, and when the adenine sequences are less than 5, the function as the spacer is not sufficient, and when the adenine sequences are more than 30, the spacer is provided too long compared to the size of the magnetic nanoparticle to have a problem.

The average diameter of the magnetic nanoparticle 100 is provided with a first length a with reference to FIG. 3, the average thickness of the shell portion is provided with a second length b, and the second length b may be provided at 0.09 times to 0.15 times greater than the first length a. Specifically, the second length b may be provided about 0.1 times to 0.15 times, or about 0.5 times to 0.15 times, about 0.7 times to 0.15 times, about 0.09 times to 0.15 times, about 0.09 times to 0.12 times greater than the first length a. If the second length b is less than 0.09 times the first length a, it is difficult to form a uniform thickness of the shell portion and it is difficult to efficiently control the primer attached to the shell portion and the PCR amplified product, and if the second length b is more than 0.15 times the first length a, it is difficult to control the movement of particles when a magnetic field is applied, and it is difficult to effectively detect an electrochemical signal.

In addition, when the first length a is 170 nm to 300 nm, the second length b may be 15 nm to 40 nm. When the first length a is less than 170 nm, there is a problem that the magnetic nanoparticles are agglomerated or aggregated in the sample, and when the first length a is more than 300 nm, it is difficult to control the movement of the magnetic nanoparticles by applying the magnetic field. In addition, when the second length b is less than 15 nm, it is difficult to form a shell portion having a uniform thickness, and when the second length b is more than 40 nm, there is a problem that the sensitivity of the movement of the magnetic nanoparticles is deteriorated by a magnetic field or current. Specifically, the first length may be about 200 nm to 300 nm, about 210 nm to 300 nm, about 220 nm to 300 nm, about 200 nm to 280 nm, or about 200 nm to 260 nm. In addition, the second length b may be about 20 nm to 40 nm, about 20 nm to 35 nm, or about 20 nm to 30 nm.

The magnetic nanoparticle part may be prepared by preparing a core portion made of iron oxide, providing a buffer portion containing silicon on the surface of the core portion, functionalizing the outer surface of the buffer portion with an amino group ($-NH_2$) or a thiol group ($-SH$) and then forming a shell portion containing gold to manufacture a magnetic nanoparticle, and mixing the magnetic nanoparticle and the modified primer.

The core portion may use an iron chloride solution as an iron precursor, and the core portion made of iron oxide may be prepared by a polyol reaction using glycol and the like serving as a reducing agent and a solvent. The shell portion may be prepared by first preparing gold nanoparticles using a chloroauric acid ($HAuCl_4$) solution as a gold precursor, attaching the gold nanoparticles to the surface of the core portion, and then growing gold. In this case, in order to stably attach the gold nanoparticles, a buffer portion containing silica may be formed on the surface of the core portion using a silica precursor, and then attached to the core portion through the buffer portion. Subsequently, a modified primer may be bound to the shell portion, and the modified primer may include at least one of a reverse primer or a forward primer.

As such, in the magnetic nanoparticle part in which the modified primer is bound to the surface of the magnetic nanoparticle, when the PCR reaction is performed, a base sequence amplified by the length of the target nucleic acids is double-stranded on the surface of the magnetic nanoparticle. Subsequently, after the magnetic nanoparticle part having an amplified product is provided in the reactor by the PCR reaction, a magnetic field may be reversibly applied into the reactor one or more times with the conductive substrate therebetween by the magnetic field applying part. By the application of the magnetic field, the magnetic nanoparticle part may move toward the opening of the reactor, and may be provided adjacent to the conductive substrate through the opening.

The kit may further include an electrochemical signal measuring part for measuring an electrochemical signal using a first electrode, a second electrode, and a three-electrode module including the first electrode, the second electrode, and a conductive substrate, which are provided in the reactor.

The first electrode includes a reference electrode, the conductive substrate includes a working electrode, and the second electrode may include a counter electrode controlling an electron balance generated from the reference electrode and the working electrode, which are performed as the three-electrode module.

The first or second electrode may consist of any one or more of gold (Au), cobalt (Co), platinum (Pt), silver (Ag), carbon nanotube, graphene, and carbon, and the conductive substrate may include any one or more of indium tin oxide (ITO), ZnO, $SnO_2$, $In_2O_3$, $CdSnO_4$, a carbon substrate material including carbon nanotubes, a fluorine-doped tin oxide (FTO) added with fluorine, and an aluminum doped zinc oxide (AZO) added with aluminum.

In addition, the electrochemical signal measuring part may measure an electrochemical signal by using the first and second electrodes and the conductive substrate. For example, the electrochemical signal measuring part may include any one or more of a differential pulse voltammeter (DPV), an anodic stripping voltammetry (ASV), a chronoamperometry (CA), a cyclic voltammetry, a square wave voltammetry (SWV), and an impedance meter.

In the embodiment of the present disclosure, the sample may include any one or more of blood, serum, plasma, saliva, ascites, amniotic fluid, semen, lacrimal fluid, cerebrospinal fluid, bone marrow, pleural fluid, synovial fluid, lymph, urine, tissue biopsies and cell lines.

According to another aspect of the present disclosure, the present disclosure includes a method for detecting Coronavirus using the kit for detecting Coronavirus described above.

The method for detecting Coronavirus includes preparing magnetic nanoparticles with primers attached on the surface thereof; obtaining magnetic nanoparticles having an amplified product on the surface by performing polymerase chain reaction (PCR) by adding the magnetic nanoparticles with the primers attached on the surface to a sample containing the Coronavirus; putting the magnetic nanoparticles having the amplified product on the surface into a reactor having an opening, covering the opening with a conductive substrate, and applying a magnetic field into the reactor from one side of the conductive substrate under a first condition; applying a magnetic field under a second condition after adding metal ions containing at least one of ruthenium (Ru), iron (Fe), silver (Ag), copper (Cu), nickel (Ni), cadmium (Cd) and zinc (Zn) into the reactor; and providing first and second electrodes in the reactor, and measuring an electrochemical signal by using the first and second electrodes and the conductive substrate together.

The preparing of the magnetic nanoparticles with the primers attached on the surface thereof may include preparing a core portion made of iron oxide, providing a buffer portion containing silicon on the surface of the core portion to prepare pre-nanoparticles, functionalizing the outer surface of the buffer portion with at least one of an amino group ($-NH_2$) and a thiol group ($-SH$) and then forming a shell portion containing gold to prepare magnetic nanoparticles, mixing the magnetic nanoparticles and the primers, and performing salt aging.

The magnetic nanoparticle part may be formed by preparing the magnetic nanoparticles and then attaching the primers to the surface of the magnetic nanoparticles.

The preparing of the magnetic nanoparticles is preparing the core portion made of iron oxide by using an iron chloride solution as an iron precursor and a polyol reaction using glycol, etc. serving as a reducing agent and a solvent. Subsequently, the shell portion may be prepared by forming the buffer portion containing silica on the surface of the core portion using a silica precursor, attaching gold nanoparticles as a seed, and then growing gold. Gold nanoparticles may be attached to the surface of the pre-nanoparticles formed from the core portion to the buffer portion, and in this case, the gold nanoparticles may be functionalized using any one of an amine group and a thiol group and then attached.

Specifically, the pre-nanoparticles are impregnated in a solution containing an amine group or a thiol group, sonicated at a temperature of 60° C. to 90° C. for 2 hours to 10 hours, and washed with water after the sonication is completed, and then the washed pre-nanoparticles are dispersed in water to prepare a pre-nanoparticle dispersion. The pre-nanoparticle dispersion may be prepared as magnetic nanoparticles by mixing gold nanoparticles and then adding a chloroauric acid ($HAuCl_4$) solution to form the shell portion. In this case, the gold nanoparticles may be prepared in advance in the form of particles having an average diameter of 0.5 nm to 5 nm and used as a seed.

The sonication is performed at a temperature of 60° C. to 90° C. for 2 hours to 10 hours so that any one of the amine group and the thiol group may be uniformly attached to the surface of the pre-nanoparticles, and process efficiency may be improved in a subsequent process of attaching the gold nanoparticles. In addition, the gold nanoparticles used as the seed may have an average diameter of 0.5 nm to 5 nm, and when the average diameter is less than 0.5 nm, the gold nanoparticles are agglomerated or aggregated on a part of the surface of the pre-nanoparticles, and when the average diameter is more than 0.5 nm, it becomes difficult to control the thickness of the shell portion. Specifically, the average diameter of the gold nanoparticles may be about 1 nm to 5 nm, about 0.5 nm to 4 nm, or about 0.5 nm to 3 nm.

The primer may include a primer modified with any one of a single thiol group and a single amino group. In the primer, since any one of a double thiol ($-SH$) group and an amino group is doubly bound in a 5' end capable of reacting with a 3' end of a specific single base sequence, the double bond of the thiol group or the amino group may be processed into a single bond.

The modified primer may be mixed with the magnetic nanoparticles and bound to the surface of the magnetic nanoparticles. In this case, the salt aging may be performed in order to prevent non-specific attachment and agglomeration of the base sequence of the modified primer from occurring.

The salt aging may include adding and mixing the magnetic nanoparticles and the modified primers to a stirrer, and then adding a first solution and a second solution in a volume ratio of 5:1 to 30:1 in the stirrer a plurality of times and sonicating the mixture. The first solution may be provided by mixing a sodium chloride solution, a phosphate buffered saline, and ultrapure water, and the second solution may be provided by mixing a phosphate buffered saline, sodium dodecyl sulfate and ultrapure water.

Specifically, the salt aging may include sequentially primary aging and secondary aging. The primary aging may be performed for 2 to 6 hours, and the sonication may be performed by adding the first and second solutions every 1 hour. The secondary aging may be performed for 4 to 12 hours, and the sonication may be performed by using 1.5 to 3-fold the first and second solutions used in the primary aging at a volume ratio and adding the first and second solutions every 2 hour interval. The salt aging is performed by the primary aging and the secondary aging by varying conditions to improve the process efficiency.

In addition, the primer may be modified to have an amino group attached thereto in addition to the thiol group. In this case, the reverse primer modified with an amino group at the 5' end may be bound to the surface of the magnetic nanoparticle by obtaining protons by controlling pH and then electrostatically binding the protons to a negatively charged gold surface.

By applying the magnetic field under the first and second conditions, at least a part of the magnetic nanoparticle part may be transferred to the opening side of the reactor to be in contact with the conductive substrate. The first condition may include a condition of 0.1 T to 1 T for 1 minute to 10 minutes, and the second condition may include a condition of 0.1 T to 1 T for 12 minutes to 30 minutes.

The first condition is for primarily attaching the magnetic nanoparticle part to the conductive substrate, and the second condition is for adding metal ions including at least one of ruthenium (Ru), iron (Fe), silver (Ag), copper (Cu), nickel (Ni), cadmium (Cd), and zinc (Zn) and then moving the magnetic nanoparticle part to which the metal ions are adsorbed onto the conductive substrate. Alternatively, instead of the metal ions, methylene blue or a compound containing a nitro group may be added.

In the measuring of the electrochemical signal, the first electrode includes a reference electrode, the conductive substrate includes a working electrode, and the second electrode may include a counter electrode controlling an electron balance generated from the reference electrode and the working electrode, which are performed as the three-electrode module.

The first or second electrode may consist of any one or more of gold (Au), cobalt (Co), platinum (Pt), silver (Ag), carbon nanotube, graphene, and carbon, and the conductive substrate may include any one or more of indium tin oxide (ITO), ZnO, $SnO_2$, $In_2O_3$, $CdSnO_4$, a carbon substrate material including carbon nanotubes, a fluorine-doped tin oxide (FTO) added with fluorine, and an aluminum doped zinc oxide (AZO) added with aluminum.

The measuring of the electrochemical signal may include any one or more of a differential pulse voltammeter (DPV), an anodic stripping voltammetry (ASV), a chronoamperometry (CA), a cyclic voltammetry, a square wave voltammetry (SWV), and an impedance meter.

Specifically, the first electrode is a reference electrode containing Ag/AgCl, the second electrode is a counter electrode containing Pt, and the conductive substrate is a working electrode containing ITO, which are performed as the three-electrode module, and the measuring of the electrochemical signal may include a differential pulse voltammetry (DPV).

An initial current signal and a final current signal may be measured by measuring the electrochemical signal, and the initial current signal means a primary current signal, and the final current signal is higher than the initial current signal with little change in the current signal.

The higher the amplification density on the surface of the magnetic nanoparticle part and the greater the number of amplified magnetic nanoparticle parts, the greater the amount of adsorption with metal ions. For example, when the concentration of the magnetic nanoparticle part having a long base pair is low compared to the magnetic nanoparticle part to which a short base sequence is attached, a difference between the initial current amount and the maximum current increases. Specifically, the initial current signal is measured by applying a current in a form in which the magnetic nanoparticle part to which the short base sequence is attached and the magnetic nanoparticle part having the long base pair are arranged randomly, on the surface of the conductive substrate, the concentration of the magnetic nanoparticle part having the long base pair is low, so that the degree of the electric signal by the adsorbed metal ions is weak. On the other hand, as the current is repeatedly applied, the magnetic nanoparticle part having the long base pair is aligned adjacent to the surface of the conductive substrate, and the magnetic nanoparticle part attached with a relatively short base sequence is handed over to the magnetic nanoparticle part having the long base pair, and thus rearrangement to be far away from the conductive substrate may occur. As such current application is repeatedly performed, the current signal reaches the final current signal maintained in a somewhat constant state, and the target nucleic acids may be effectively detected by a difference between the initial current signal and the final current signal.

In the kit and the method for detecting the target nucleic acids using the magnetic nanoparticles according to an embodiment of the present disclosure, even when the concentration of the target nucleic acids in the sample is a M or less, the target nucleic acids may be detected.

In addition, such a ultra-sensitive disease detection system may play a key role in the development of rapid and accurate diagnostic test technology for various diseases that will appear in the upcoming future. In the present disclosure, it was possible to confirm a possibility by applying the detection method of an embodiment of the present disclosure to infectious diseases of COVID-19 as a disease model for verification. Until now, various COVID-19 diagnostic technologies such as molecular-based assay, Serology-based immunoassay, antigen-based assay, and the like have been developed, and among the technologies, molecular diagnostic technology is regarded as the gold standard for diagnosing COVID-19 infectious diseases with its high accuracy, sensitivity, and specificity and capable of detecting at an early stage of infection. The detection method of the present disclosure may be grafted to such molecular diagnostic technology, which may further enhance the advantages of conventional molecular diagnostic technologies and provide a diagnostic method with high ultra-high sensitivity at the same time. Based thereon, it is possible to construct a rapid diagnosis system capable of rapidly diagnosing diseases with high accuracy while dramatically reducing the number of repetitive cycles in PCR. According to the present disclosure, it is possible to reduce the PCR process within about 10 minutes by using the magnetic nanoparticle part with the primers attached to the surface of the magnetic nanoparticles. As a result, it can be expected to be used as a real-time on-site diagnosis system for urgent COVID-19 infectious diseases by significantly shortening the detection time. In addition, due to the collection using the magnetic properties of the magnetic nanoparticles and the detection of electrochemical signals using DPV, beyond the detection limit of f M to p M of the conventional molecular diagnostics, a concentration range of a M and below may be detected. In addition, the detection method of the present disclosure can be expected to expand to the development of diagnostic test technology for future diseases (e.g., various cancers, virus-induced diseases) based on the effect on the COVID-19 model.

Hereinafter, Preparation Examples and Examples of the present disclosure will be described. However, the following Examples are only a preferred Example of the present disclosure, and the scope of the present disclosure is not limited by the following Examples.

Preparation Example 1 (Preparation of Iron Oxide Nanoparticles)

Iron oxide nanoparticles were synthesized through a polyol method. Iron chloride hexahydrate ($FeCl_3 \cdot 6H_2O$) was used as an iron ion precursor, ethylene glycol serving as both a reducing agent and a solvent, sodium acetate (NaOAc) assisting hydrolysis, and $H_2O$ were used, respectively. In a three-necked flask containing 50 mL of ethylene glycol, 2 mmol of $FeCl_3 \cdot 6H_2O$, 6 mmol of NaOAc, and 150 mmol of $H_2O$ were added, and rapidly heated to 200° C. for 15 minutes while mechanical stirring. The reaction time was maintained at 200° C. for 3 hours and 30 minutes, and then the mixture was cooled to room temperature and washed several times with ethanol and dispersed in $H_2O$ to prepare iron oxide nanoparticles.

Preparation Example 2 (Preparation of Gold Nanoparticles)

For the gold nanoparticles, gold chloride trihydrate ($HAuCl_4 \cdot 3H_2O$) was used as a gold ion precursor, and sodium borohydride ($NaBH_4$) as a reducing agent, trisodium citrate as a stabilizer, and $H_2O$ as a solvent were used for the reaction, respectively. First, the concentration was adjusted with 0.25 mM $HAuCl_4 \cdot 3H_2O$ and 0.25 mM trisodium citrate in 50 mL of $H_2O$, and then 1.5 mL of cold $H_2O$ ($NaBH_4$, 0.1 M) was added. In this case, while the temperature was kept at room temperature, the magnetic stirring reaction was performed using a magnetic bar.

Preparation Example 3 (Preparation of Magnetic Nanoparticles)

By using the iron oxide nanoparticles prepared in Preparation Example 1, silica was formed on the surface of the iron oxide nanoparticles using a Stφber method using a TEOS hydrolysis reaction under an ammonia catalyst. Ethanol and $H_2O$ were used as solvents, and polyvinylpyrrolidone (PVP) as a stabilizer, ammonium hydroxide solution ($NH_4OH$) as a catalyst, and tetraethyl orthosilicate (TEOS) as a silica precursor were used, respectively. In the reactor, 50 mL of ethanol, 7.5 mL of $H_2O$, 2.5 mL of $NH_4OH$, and 400 mg of PVP were added and mixed. Then, 25 mg of the iron oxide nanoparticles prepared in Preparation Example 1 were added. After 0.050 mL of TEOS was added to a uniform mixed solution mixed with the iron oxide nanoparticles, shaking was performed at room temperature for 1 hour and 30 minutes. After the reaction was completed, the prepared pre-magnetic nanoparticles (magnetic nanoparticles with silica formed on the surface) were dispersed in 10 mL of ethanol after washing several times with ethanol.

In order to attach the gold nanoparticles prepared in Preparation Example 2 to the pre-magnetic nanoparticles, 3-aminopropyl triethoxysilane (APTES) was used as a precursor of an amine group (—$NH_2$), and 2-propanol was used as a solvent. 4 mL of ethanol in which the pre-magnetic nanoparticles were dispersed was replaced with a solvent of 10 mL of 2-propanol, and 0.050 mL of APTES was added to perform shaking. Then, the reaction was performed by sonication at 80° C. for 4 hours. After the reaction was completed, the prepared pre-magnetic nanoparticles functionalized with the amine group on the surface were washed with $H_2O$ and dispersed in 5 mL of $H_2O$. 5 mL of $H_2O$ in which the pre-magnetic particles functionalized with an amine group on the surface were dispersed and 30 mL of gold nanoparticles were mixed together, and then shaken for 16 hours. Subsequently, $H_2O$ dissolved in 1 wt % of PVP was uniformly shaken with a stabilizer to prepare pre-magnetic nanoparticles with gold nanoparticles attached to the surface, washed with $H_2O$, and dispersed in 20 mL of $H_2O$. Here, the gold nanoparticles are bound to the pre-magnetic nanoparticles through the amine group.

For a gold nanoparticle growth solution, 45 mg of $HAuCl_4 \cdot 3H_2O$ and 50 mg of potassium carbonate ($K_2CO_3$) were dissolved in 500 mL of water, aged for 16 hours, and then used as the gold nanoparticle growth solution. 1 mg of the pre-magnetic particles functionalized on the surface with the amine group was dispersed in 2 mL of 1 wt % of polyninylpyrrolidone (PVP, 55,000 kDa), and then mixed with 80 mL of the gold nanoparticle growth solution and 1 mg/mL 3 mL of bis(p-sulfonatophenyl)phenylphosphine dihydrate dipotassium salt (BSPP). Subsequently, 2 mL of 37 wt % formaldehyde was injected and shaken for 2 hours to prepare magnetic nanoparticles having a cord part made of iron oxide particles and a shell portion made of gold. The prepared magnetic nanoparticles were washed with $H_2O$ and dispersed in 20 mL of $H_2O$. FIG. 5 is a schematic diagram and a TEM image of magnetic nanoparticles of Preparation Example 3. FIG. 6 is an SEM image of the magnetic nanoparticles of Preparation Example 3. FIG. 7 is a graph showing sizes of the magnetic nanoparticles of Preparation Example 3 and the iron oxide nanoparticles (core) according to Preparation Example 1. FIG. 8 is a result of confirming magnetic field characteristics of the magnetic nanoparticles of Preparation Example 3.

Referring to FIGS. 5 to 7, it was confirmed that the diameter of the iron oxide nanoparticles was about 191.8 nm, and the diameter of the magnetic nanoparticles with gold on the surface was about 237 nm, and the particle size was also formed evenly. Referring to FIG. 8, it was confirmed that the eminence when a field is 0 indicates 0, and the coercivity is measured as small as 0 so that agglomeration does not occur because it is required to be amplified. In addition, it was confirmed that a maximum magnetic field exhibited a high value of about 16.

Preparation Example 4 (Preparation of Magnetic Nanoparticles Bound with Modified Primer)

The magnetic nanoparticles were functionalized by attaching a primer for amplifying Coronavirus to the magnetic nanoparticles prepared above.

First, a reverse primer and a forward primer having a double thiol group at a 5' end were processed with a single thiol group.

0.907 g (0.0756 M) of sodium phosphate monobasic and 3.285 g (0.2314 M) of sodium phosphate dibasic were added to 100 mL of ultrapure water (UPW) to prepare a 0.307 M phosphate buffer saline (PBS). 0.143 g ($0.927 \times 10^{-3}$ moles) of 1,4-dithiolthreitol (DTT) was put in 5 mL of 0.307 M PBS together with 150 μL of 2 M NaOH to prepare 5.150 mL of a 0.18 M DTT solution. In order to process a base sequence in a single thiol state, 120 μL (12 nmole) of a 100 μM thiolated primer solution and 150 μL of the DTT solution prepared above were injected into a microtube wrapped with an aluminum foil and then mechanically stirred for 1 hour.

A NAP-5 column was prepared, and 10 mL of UPW was sequentially injected into the NAP-5 column by 3 mL, 3 mL, 3 mL, and 1 mL to perform an equilibrium reaction. A solution subjected to mechanical stirring for 1 hour was injected into the NAP-5 column, and the UPW was additionally injected so that the solution volume in the column became 500 μL. After the solution was fully permeated, the microtube was disposed at the bottom of the column. In addition, 500 μL of UPW was injected and 500 μL of the product was received in the microtube until flowing completely out of the microtube. After 3 μL of the received solution was mixed with 297 μL of UPW in another microtube, the mixed solution was transferred to 300 μL of a quartz cell (quartz cuvette), and an absorbance (OD, Optical Density) value was measured by UV-Vis spectrophotometry. An average value of the absorbance (A260) at a wavelength of 260 nm was measured by measuring the absorbance total three times in the wavelength range of 200 to 400 nm, and a molarity (M) was calculated. The molarity was calculated by Equation 1 below.

$$M = \frac{A_{260}}{\text{Extinction Coefficient} \times \text{Path Length (1 cm)}} \times \text{Dilution Factor (100)} \quad [\text{Equation 1}]$$

After an amount required to extract 4 nmole of the primer was calculated from the calculated molarity, the corresponding amount of the mixed solution was distributed to each of several microtubes. Thereafter, each tube was filled with UPW so that the volume of the solution was 500 μL.

After 10 μg of the magnetic nanoparticles prepared in Preparation Example 3 were transferred to the microtube, a neodymium magnet (about 3000 to 5000 Gauss) was placed at the bottom of the tube and the magnetic nanoparticles were collected for 15 minutes. Thereafter, a supernatant was removed and the collected magnetic nanoparticles were dispersed in 250 μL of UPW.

In a conical tube, 100 mg of sodium dodecyl sulfate (SDS) was added to 10 mL of UPW and vortexed to prepare a 1% (w/v) SDS solution. 500 μL of 4 nmol the primer having the single thiol group prepared above, 250 μL of the washed magnetic nanoparticles, and 7.57 μL of the 1% SDS solution were mixed and mounted on a shaker, shaken for 1 hour, and sonicated by 30 minutes every 10 minutes. The shaking was performed for 1 hour, and then the shaking was additionally shaken for 15 hours without sonication.

Thereafter, salt-aging was performed in order to remove non-specific attachment and agglomeration of the primer base sequence. A salt-aging solution (3.322 M NaCl) was prepared by mixing 6.644 mL of a 5 M NaCl solution with 3.356 mL of UPW. 500 μL of PBS (0.1 M, pH 7.4) was added and mixed to 9.5 mL of UPW together with 10 mg of SDS to prepare a PBS·SDS solution (5 mM PB, 0.1% SDS, pH 7.2). 84.18 µL of the PBS·SDS solution was put into the tube and shaken for 30 minutes, then added with 1.69 µL of the PBS·SDS solution and 15.21 µL of the salt-aging solution, vortexed for 30 seconds and sonicated for 30 seconds, and then shaken for 2 hours. 1.69 µL of the PBS·SDS solution and 15.21 µL of the salt-aging solution were added thereto, and the vortexing, sonicating and shaking processes were repeated 4 times. 3.38 µL of the PBS·SDS solution and 30.42 µL of the salt-aging solution were added thereto again, vortexed for 30 seconds, sonicated for 30 seconds, and then shaken for 1 hour. 3.38 µL of the PBS·SDS solution and 30.42 µL of the salt-aging solution were added thereto, and the vortexing, sonicating and shaking processes were repeated 3 times. This whole process was performed for total 8 hours, and 16.9 µL of the PBS·SDS solution and 152.1 µL of the salt-aging solution were added. Thereafter, the mixture was further shaken for 8 hours to allow the salt-aging to proceed sufficiently. A final solution consisted of pH 7.2, 0.5 M NaCl, 0.5 mM PBS, AND 0.0175% SDS.

After the salt-aging was completed, a washing process was performed to extract only the magnetic nanoparticles to which the primers were attached. After sonicating for 1 minute, a magnet was placed at the bottom of a test tube and the magnetic nanoparticles were sunken for 18 minutes. Thereafter, the supernatant was removed, 1 mL of UPW was added, and then vortexed and sonicated for 30 seconds, respectively, and then the magnetic nanoparticles were collected for 18 minutes using a magnet again. After repeating the washing process a total of 3 times, 10 µL of UPW was added to the solution and transferred to 0.2 mL of a PCR tube. The magnetic nanoparticles attached with the primers were collected for 18 minutes with a DynaMag PCR magnetic separator, and then the supernatant was removed, 5 µL of UPW was added, and sonicated for 30 seconds.

Example 1

1. Magnetic Nanoparticles Having Base Sequence Specific to Coronavirus

5 µL of magnetic nanoparticles attached with a reverse primer or forward primer, 10 µL of a 100 µM forward primer or reverse primer single sequence, 2 µL of a target single sequence (COVID-19 cDNA, complementary DNA), 10 µL of a 10× High Fidelity PCR Buffer, 1 µL of a 10 mM dNTP mixture, 2 µL of 50 mM $MgSO_4$, 0.2 µL of platinum Taq DNA polymerase high fidelity (5 U/µL), and 24.8 µL of UPW were added to a PCR tube and pipetted for 1 minute to uniformly mix all the solutions. Thereafter, after repeating the polymerase chain reaction (PCR) 35 times, the magnetic nanoparticles to which the amplified product was finally attached were washed 3 times and dispersed in 5 µL of UPW.

Here, the PCR setting was set differently depending on the size of each DNA sequence. The DNA sequence used specific markers of COVID-19 virus, sequences of N (Nucleocapsid protein), E (Envelope protein), and RdRP (RNA-dependent RNA Polymerase), and the sizes thereof were 67 mer, 113 mer, and 100 mer, respectively. A single base sequence for each DNA sequence is SEQ ID NO: 15, SEQ ID NO: 14, and SEQ ID NO: 13.

In the case of using the magnetic nanoparticles to which the forward primer is attached, a reward primer and a target complementary thereto were used, and the remaining conditions were applied in the same manner.

In addition, information on this DNA sequence was shown in Table 1 and FIG. 9 below.

TABLE 1

| Gene | Primer name | Institution | Gene location** | Primer type | Sequence (5' → 3') |
|---|---|---|---|---|---|
| N2 | 2019-nCoV_N2-R | CDC* (U.S) | 29230-29213 | Forward primer | SEQ ID NO: 12 |
| | | | | Modified forward primer*** | 5' Thiol C6 S-S-A15-SEQ ID NO: 12 |
| | 2019-nCoV_N2-F | | 29164-29183 | Reverse primer | SEQ ID NO: 9 |
| | | | | Modified reverse primer*** | 5' Thiol C6 S-S-A15-SEQ ID NO: 9 |
| E | E_Sarbeco_R2 | Charite (Germany) | 26381-26360 | Forward primer | SEQ ID NO: 11 |
| | | | | Modified forward primer*** | 5' Thiol C6 S-S-A15-SEQ ID NO: 11 |
| | E_Sarbeco_F1 | | 26269-26294 | Reverse primer | SEQ ID NO: 8 |
| | | | | Modified reverse primer*** | 5' Thiol C6 S-S-A15-SEQ ID NO: 8 |
| RdRP | RdRP_SARSr-R1 | | 15530-15505 | Forward primer | SEQ ID NO: 10 |
| | | | | Modified forward primer*** | 5' Thiol C6 S-S-A15-SEQ ID NO: 10 |
| | RdRP_SARSr-F2 | | 15431-15452 | Reverse primer | SEQ ID NO: 7 |
| | | | | Modified reverse primer*** | 5' Thiol C6 S-S-A15-SEQ ID NO: 7 |

In Table 1 above, *CDC is the Center for Disease Control and Prevention, and  is a specific nucleotide sequence isolated from the entire gene of Wuhan-Hu-1, severe acute respiratory syndrome Coronavirus 2. * is a modified reverse primer or forward primer modified with a C6 S—S set modified with thiol by modifying the 5' end of the reverse primer or forward primer and attaching SEQ ID NO: 16 (A15 spacer, where A is adenine) to the modified 5' end. In addition, in Table, complementary DNA (cDNA) generated by reverse transcription of SARS-CoV-2 RNA serves as a template for PCR amplification. Accordingly, depending on the reverse-transcribed RNA, a primer hybridizing with the template cDNA is a reverse primer or a forward primer, wherein a primer hybridizing with a DNA strand complementary to a cDNA strand is the forward primer or the reverse primer.

The selected target base sequence (N, E, RdRP) is based on data (FIGS. 10 and 11) on a reverse transcription-polymerase chain reaction (RT-PCR)-based COVID-19 diagnostic kit urgently approved by the FDA. FIGS. 10 and 11, a) represents a limit of detection (LoD), and b) represents a cycle threshold (Ct). In FIGS. 10 and 11, ORF represents an open reading frame; RdRP represents an RNA-dependent RNA polymerase; S represents a spike; E represents envelope; N represents an abbreviation for nucleocapsid.

Table 2 shows a comparison of the sizes before and after attaching the modified primers to the magnetic nanoparticles. After experimenting 5 times for each sample, the diameter was measured by dynamic light scattering (DLS).

TABLE 2

| Type of magnetic nanoparticle | Hydrodynamic diameter (d · nm) | Polydispersity Index (PDI) |
|---|---|---|
| Functionalized magnetic nanoparticle 1 | 290.3 | 0.096 |
| Functionalized magnetic nanoparticle 2 | 277.4 | 0.264 |
| Functionalized magnetic nanoparticle 3 | 289.4 | 0.253 |
| Functionalized magnetic nanoparticle 4 | 300 | 0.152 |
| Functionalized magnetic nanoparticle 5 | 294.1 | 0.279 |
| Average value | 290.2 ± 8.3 | 0.209 ± 0.080 |
| Magnetic nanoparticle 1 | 233 | 0.141 |
| Magnetic nanoparticle 2 | 245.5 | 0.002 |
| Magnetic nanoparticle 3 | 215.6 | 0.260 |
| Magnetic nanoparticle 4 | 272 | 0.291 |
| Magnetic nanoparticle 5 | 255.6 | 0.046 |
| Average value | 244.3 ± 21.5 | 0.148 ± 0.127 |

Here, the modified primer attaches a thiol group to the 5' end for binding the reverse primer or to the forward primer with gold, and attaches a sequence A to 15 mer (A15 spacer) so that a target single sequence is bound well by ensuring a distance from the surface of the magnetic nanoparticles. Here, the thiol group at the 5' end forms a strong bond with a free thiol group through a reduction reaction with gold on the surface of the magnetic nanoparticles, and bonds the modified primer to the surface of the magnetic nanoparticles. The modified primer complementarily binds to a specific sequence of COVID-19 cDNA and is polymerized from the 5' end to the 3' end by nSLAM reaction.

FIG. 9 illustrates a primer set for nSLAM for detecting COVID-19, a gene location of a COVID-19 biomarker, and a binding pattern of COVID-19 cDNA and a primer attached to the surface of the magnetic nanoparticles. The sources of the primer set to be used are 2019-nCoV_N2 (CDC, USA), E_Sarbeco (Charite, Germany), and RdRP_SARSr (Charite, Germany), respectively.

2. nSLAM Mechanism Using Modified Reverse Primer-Attached Magnetic Nanoparticles (Functionalized Magnetic Nanoparticles)

In a first cycle of nanoparticle surface localized amplification (nSLAM) of a functionalized magnetic nanoparticle, a target DNA complementarily binds to a reverse primer on the surface of the magnetic nanoparticle. Thereafter, the target DNA is used as a template strand to be polymerized up to the 3' end of the template strand through DNA polymerase and dNTP.

In a second cycle of nSLAM, the template strand is separated from the surface of the magnetic nanoparticle, and a single DNA strand complementary to the template strand remains on the surface of the magnetic nanoparticle. Here, a forward primer of a specific sequence is complementarily bound, and the single DNA strand on the surface of the magnetic nanoparticle is used as a template to be polymerized again through DNA polymerase and dNTP.

In a third cycle of nSLAM, a new single DNA strand polymerized from the forward primer is separated from the surface of the magnetic nanoparticle and polymerized again by binding with a neighboring free reverse primer. The polymerized single DNA strand remaining in the magnetic nanoparticle is also repolymerized by binding with the neighboring free forward primer.

As this process is repeated and the nSLAM cycle is repeated, the number of DNA strands simultaneously polymerized increases, and the double-stranded DNA captured on the surface of the magnetic nanoparticle increases. In addition, the double-stranded and single-stranded target DNAs exist at the same time to exist in the form of a complex DNA.

FIG. 12 illustrates an nSLAM reaction mechanism step by step based on the functionalized magnetic nanoparticle using SARS-CoV-2 (hereinafter, COVID-19). Steps 1 and 2 of FIG. 12 are the first cycle of nSLAM, and the cDNA of SARS-CoV-2 complementarily binds to the modified reverse primer of the magnetic nanoparticle and then DNA is polymerized. Steps 3 to 5 of FIG. 12 are the second cycle of nSLAM, and a state in which after the template strand is separated, the forward primer binds to single DNA attached to the magnetic nanoparticle to be polymerized again. Steps 6 to 7 of FIG. 12 are the third cycle of nSLAM, and a state in which the single strand polymerized from the forward primer is separated and bound to the neighboring reverse primer, and the single strand remaining in the magnetic nanoparticle binds to a new neighboring forward primer to be polymerized again.

In this case, orange and red DNA strands of Step 7 are the same strand as the target DNA sequence, and a double strand amplified using the DNA strands as a template is identical to the double strand of the target DNA sequence. On the other hand, DNA polymerized using a long single strand consisting of blue, light blue, and gray as a template has a partially double-stranded complex DNA. Accordingly, in Step 8, most of the amplified products are in the double-stranded form of the target DNA sequence, but a small number of products have a form that exists as a double strand only at a specific site on a long single strand.

Example 2

1. Electrochemical Detection of Magnetic Nanoparticles Containing nSLAM Amplified Products A double helix as long as the target DNA sequence is attached to the surface of the magnetic nanoparticles to which modified reverse primers for specific amplification to the target DNA sequence after nSLAM is performed. Accordingly, the sizes of the magnetic nanoparticles to which these double helices are attached become as large as the length of the target DNA sequence, and when the target DNA sequences are N2, E, and RdRP, the sizes of about 82 mer, 128 mer and 115 mer are formed, respectively.

5 µL of each nSLAM amplified product containing the magnetic nanoparticles largely formed above was prepared, respectively.

An ITO substrate (20 mm×30 mm) of 10 Ω/sq and 0.7 T was washed three times with acetone, ethanol, and water, and was fixed in close contact with the bottom of an electrochemical detection container (cell). 5 µL of the nSLAM amplified product was injected into circular holes at the bottom of the electrochemical detection container and left in contact with the ITO substrate. After the magnetic field was applied for 2 minutes at the bottom of the circular holes to collect all magnetic nanoparticles in the nSLAM amplified product on the substrate, 1 mL of PBS containing 50 µM of $Ru(NH_3)_6Cl$ and 4 mM $K_3Fe(CN)_6$ as an electrocatalytic reporter pair solution was injected into the detection container and the applied magnetic field was immediately removed. This state was maintained for 18 minutes until the DNA on the surface of the magnetic nanoparticles sunk to the bottom of the ITO substrate reacted with ions in the solution.

After 18 min, a reference electrode (tube-shaped Ag/AgCl reference electrode), a counter electrode (wire-shaped Pt counter electrode), and a working electrode (ITO substrate) were connected to each other using a potentiostat (EM-stat3/Palmsense) to set 3 electrodes. After the EM-stat3 device was switched to a differential pulse voltammetry (DPV) mode, a pulse height of 50 mV, a pulse width of 0.05 s, a step height of 5 mV, and a step width of 0.1 s were set, and a voltage of 0 to −0.5 V was applied, and then a peak of a current value generated in each solution was measured.

When the voltage was applied to the DPV by connecting the three-electrode system, electrons are transferred to ruthenium ions in the solution by sequentially passing through the electrode, the ITO substrate, the surface of the magnetic nanoparticles, and the amplified DNA double-strand and the ions were reduced. The reduced ruthenium ions are oxidized again by transferring electrons to the surrounding iron ions, and while such an electron transfer process is repeated, a redox current is generated. The current signal has a shape of a Boltzmann curve in which peaks exist. The greater the number and length of DNA double strands, the more negatively charged DNA may attract more ruthenium cations, and electrons of the magnetic nanoparticles with amplified DNA products attached to the surface are more actively moved than magnetic nanoparticles attached with only a modified reverse primer, so that a significantly high current value is measured (peaks of the measured current signal are significantly high). By using such a difference in current signal height, it is possible to check the presence or absence of the SARS-CoV-2 genetic material, which may immediately diagnose whether or not COVID-19 is infected.

Example 3

An experiment was performed to determine a minimum concentration of target DNA required for diagnosing whether or not to be infected with COVID-19 using a diagnostic kit of the present disclosure.

First, a limit of detection (LoD) for COVID-19 cDNA was measured. The limit of detection is a minimum concentration of a target that is determined to be detectable for a specific target by a sensor. To this end, the concentration of COVID-19 cDNA was set to $10^{-25}$ M, $10^{-22}$ M, $10^{-19}$ M, $10^{-16}$ M, $10^{-13}$ M, and $10^{-19}$ M, respectively, and nSLAM was performed at each concentration. The nSLAM amplified product was placed in a detection container and a minimum concentration exceeding the signal threshold was confirmed through DPV electrochemical detection.

First, cDNA to be used for nSLAM was prepared. The cDNA was prepared by reverse transcription of RNA, and the amount of RNA was converted based on the amount of cDNA to be prepared and injected. The amounts of cDNA produced by reverse transcription of several samples containing the same amount of RNA were made with statistics and then summarized in Table 3. As a result, it was confirmed that an average converted value for 7 cDNA samples was about 5.08 times.

TABLE 3

| RNA sample | RNA concentration ** (ng/µL) | Used volume (µL) | cDNA sample | CDNA concentration *** (ng/µL) | Total volume of cDNA solution (µL) | Total amount of cDNA (µg) | Conversion factor† (from RNA to cDNA) | Average conversion factor |
|---|---|---|---|---|---|---|---|---|
| RNA 1 | 53.3 | 46.9 (2.5 µg RNA) | cDNA_1 | 242.2 | 59.4 | 14.39 | 5.76 | 5.08 (±0.41) |
| RNA 2 | 58.2 | 42.9 (2.5 µg RNA) | cDNA_2 | 218.8 | 55.4 | 12.12 | | 4.85 |
| RNA 3 | 57.3 | 43.6 (2.5 µg RNA) | cDNA_3-1 | 231.5 | 56.1 | 12.99 | | 5.20 |
| | | | cDNA_3-2 | 226.1 | 56.1 | 12.68 | | 5.07 |
| | | | cDNA_3-3 | 228.4 | 56.1 | 12.81 | | 5.12 |

TABLE 3-continued

| RNA sample | RNA concentration ** (ng/μL) | Used volume (μL) | cDNA sample | CDNA concentration *** (ng/μL) | Total volume of cDNA solution (μL) | Total amount of cDNA (μg) | Conversion factor† (from RNA to cDNA) | Average conversion factor |
|---|---|---|---|---|---|---|---|---|
| RNA 4 | 57.7 | 43.3 (2.5 μg RNA) | cDNA_4-1 cDNA_4-2 | 196.9 231.5 | 55.8 55.8 | 10.99 12.92 | | 4.40 5.17 |

Indexes of Table 3 are as follows.
* represents a subclinical RNA sample (NCCP#43327) obtained from the National Culture Collection for Pathogens, SARS-CoV-2 virus was obtained from an infected patient, and RNA was extracted and purified by NCCP before obtaining.
** represents an RNA concentration calculated by Equation 2 and UV-Vis absorbance measurements.
[Equation 2]
Concentration (ng/μL) = Absorbance at $\lambda_{max}$/Pathlength (1 cm) × Conversion factor (40 ng/μL) × Dilution factor (100X) (n = 3 per sample)
*** represents a cDNA concentration calculated by Equation 3 and UV-Vis absorbance measurements.
[Equation 3]
Concentration (ng/μL) = Absorbance at $\lambda_{max}$/Pathlength (1 cm) × Conversion factor (33 ng/μL) × Dilution factor (100X) (n = 3 per sample)
†indicates an amount of cDNA (μg) generated from 1 μg of SARS-COV-2 RNA according to a conversion factor.

A SARS-CoV-2 Wild-Type RNA sample, a COVID-19 genetic material, was received from the National Culture Collection for Pathogens (NCCP) of the Korea Disease Control and Prevention Agency (KDCA), and a semi-clinical sample extracted from an actual patient was obtained to synthesize single-stranded cDNA having a sequence complementary to this RNA using a Superscript III First-Strand Synthesis System (Invitrogen) Reverse transcription kit for RT-PCR. 2.5 μg of SARS-CoV-2 RNA, 0.5 μL of Random Hexamer (50 ng/μL), and 1 μL of 10 nM dNTP mix were added to a PCR tube and then filled with 10 μL of UPW. Thereafter, the mixture was incubated at 65° C. for 5 mM and cooled on ice for 1 mM. 2 μL of a 10×RT buffer, 4 μL of 25 mM $MgCl_2$, 2 μL of 0.1 M DTT, 1 μL of 40 U/μL of RNaseOUT, and 1 μL of 200 U/μL SuperScript III reverse transcriptase were further added to the tube, and then sequentially incubated at 25° C. for 10 minutes and at 50° C. for 50 minutes. Finally, the mixture was incubated at 85° C. for 5 minutes and cooled on ice for 5 minutes. 1 μL of 2 U/μL of E. coli RNase H was added thereto, and incubated at 37° C. for 20 minutes, and the prepared cDNA was stored at 4° C.

5 μL of functionalized magnetic nanoparticles prepared in the above Preparation Example were added in 21 PCR tubes. In 18 tubes among the tubes, 24.8 μL of UPW, 5 μL of a 10× High Fidelity PCR buffer, 1 μL of a 10 mM dNTP mix, 2 μL of 50 mM $MgSO_4$, 0.2 μL of Platinum Taq DNA Polymerase High Fidelity (5 U/μL), and 10 μL of a forward primer were added, respectively, and then the tubes were bundled by three (a total of 6 bundles), and 2 μL of each cDNA at a different concentration described above was added to each bundle. After the tubes were sufficiently mixed, nSLAM amplification was performed for 18 tubes. Initial denaturation (95° C.) was performed once for 30 seconds, and the nSLAM cycle was performed 35 times by setting denaturation (94° C.) for 15 seconds, annealing (53° C.) for 30 seconds, and extension (68° C.) for 1 minute and then terminated at 4° C. In order to maintain a uniform dispersion of particles during the nSLAM process, the tubes were taken out when the extension of the 18-th nSLAM cycle elapsed 55 seconds and sonicated for 30 seconds, and then nSLAM was performed again.

After completion of nSLAM, a washing process was performed to extract an nSLAM amplified product. 21 tubes were put in a DynaMag PCR magnetic separator and particles were collected for 18 minutes. After removing a supernatant, 20 μL of UPW was added, sonicated for 30 seconds, and then put in a magnetic separator to collect particles for 18 minutes. This washing process was repeated 3 times, and the collected particles were finally dispersed in 5 μL of UPW.

The amplification was confirmed by comparing electrochemical signals between the 18 tubes subjected to nSLAM above and the 3 tubes not subjected to nSLAM. The electrochemical signal detection method was performed in the same manner as in Example 2, and the electrochemical signals were measured 12 times for each solution. A threshold was calculated using Equation 4 below.

Threshold=(control sample mean signal)+(3×standard deviation of control sample signal)   [Equation 4]

A sigmoid curve (Sigmoid fitting) was derived and analyzed using the measurement results for an RNA-dependent RNA polymerase (RdRP) section of a COVID-19 base sequence. As a result, it was confirmed that a signal exceeded the threshold when the concentration of cDNA was $0.455 \times 10^{-18}$ M (0.274 copies/μL) or higher, and the concentration was converted by considering cDNA 5.08 copy per COVID-19 RNA 1 copy to correspond to RNA 0.054 copies/μL. This was significantly lower than a limit of detection of 1 to 2 copies/μL RNA (1 aM level) of existing molecular diagnostic kits, and it is possible to diagnose Coronavirus with a very small amount compared to existing diagnostic kits.

FIG. 13 is a result illustrating a change in DPV electrochemical signal according to a concentration of COVID-19 RNA when nSLAM is performed on an RdRP base sequence of a COVID-19 genetic material.

This is a result of measuring DPV of an amplified product that was subjected to nSLAM 35 times at each concentration of RNA. The limit of detection was found as RNA 0.054 copies/μL.

In addition, the temperature setting of the annealing step in nSLAM was set after experiments at various temperatures to find an optimal temperature. This experiment was confirmed by electrophoresis of genes after performing PCR for each temperature, and the electrophoresis results are shown in FIG. 14.

In the actual nSLAM process, the samples are first preheated at 95° C. for 30 seconds, and then enter a full-scale cycle, and one cycle consists of a denaturation step at 95° C.

for 15 seconds, an annealing step at 53° C. for 30 seconds, and an extension step at 68° C. for 1 minute. Here, in order to find the optimal temperature at which the most amplified products may be produced in the annealing step where the primer binds to a template strand, the PCR process was conducted in three temperature sections. A annealing temperature Ta was set to a lower temperature section than Tm in consideration of a melting point Tm of the primers, and it was confirmed that the melting points of all primers were in the late 50° C. to mid 60° C. Therefore, the set Ta temperature section was set to 53° C., 56° C., and 59° C. lower therethan.

Unlike the actual nSLAM, a modified reverse primer processed with a simple 5' end was used, not the reverse primer attached to the magnetic nanoparticles. Each primer set was used for N2, E, and RdRP targets, and Ta for each primer set was differently set to 53° C., 56° C., and 59° C., and simple PCR was performed (35 cycles for each primer set).

Thereafter, the amplified products were loaded on a 1.8% agarose gel, and then electrophoresis was performed at 180V power for 80 minutes. In FIG. 14, as compared with a left 50 bp DNA ladder, a position of the band made for each target corresponds to the expected size of the amplified product, and when comparing Ta with each other, the brightest and strongest band was formed at 53° C. for all targets, which was meant that the most amplified products were synthesized.

Based on this, the actual nSLAM process was performed by setting the annealing temperature to 53° C.

Example 4

An experiment was performed to determine a minimum number of nSLAM cycles required for diagnosing whether or not to be infected with COVID-19 using a diagnostic kit of the present disclosure.

First, 5 μL of functionalized magnetic nanoparticles prepared in Preparation Example were added in 27 PCR tubes, respectively. Except for 3 tubes, in the remaining 24 tubes, 24.8 μL of UPW, 5 μL of a 10× High Fidelity PCR buffer, 1 μL of 10 mM dNTP mix, 2 μL of 50 mM MgSO$_4$, 0.2 μL of Platinum Taq DNA Polymerase High Fidelity (5 U/μL), 10 μL of 100 μM forward primer, and 2 μL of SARS-CoV-2 cDNA at a concentration of 1 fM were added, respectively. The preparing method of cDNA was performed in the same manner as in Example 3 above. A different number of nSLAM cycles were performed for each bundle by bundling 24 tubes by 3 (total of 8 bundles). The number of nSLAM cycles was set to 3, 5, 10, 15, 20, 25, 30, and 35 times, respectively. With respect to 24 tubes after sufficiently mixing the solution, initial denaturation (95° C.) was performed once for 30 seconds, and a predetermined number of PCRs was performed by setting denaturation (94° C.) for 15 seconds, annealing (53° C.) for 30 seconds, and extension (68° C.) for 1 minute and then terminated at 4° C. In order to maintain a uniform dispersion of particles during the nSLAM process, in a third cycle for a sample with a total number of 5 nSLAM cycles, a fifth cycle for a sample with 10 nSLAM cycles, an eighth cycle for a sample with 15 nSLAM cycles, a 10-th cycle for a sample with 20 nSLAM cycles, a 13-th cycle for a sample with 25 nSLAM cycles, a 15-th cycle for a sample with 30 nSLAM cycles, and a 18-th cycle for a sample with 35 nSLAM cycles, at 55 seconds of the extension step, the tube was taken out and sonicated for 30 seconds, and then nSLAM was performed again.

After the nSLAM process, washing was performed in the same manner as in other Examples.

Here, a target sequence amplified on COVID-19 cDNA is an RNA-dependent RNA polymerase (RdRP) sequence, and the reverse and forward primers used in nSLAM were used as described in Table 1.

The electrochemical detection process for 27 tubes (including 3 control samples) was also performed in the same manner as in other Examples.

As a result of measurement using the RdRP sequence, it was confirmed that the threshold was exceeded from the third nSLAM cycle.

The same experiment was performed even on base sequences of N2 (nucleocapsid protein) and E (envelope protein). When only one target gene is set, since it is vulnerable to base sequence diversity and has a high probability of misdiagnosis, the World Health Organization (WHO) recommends setting two or three types of target genes for molecular diagnosis of COVID-19. One of them is a screening assay, and the other is a confirmatory assay, and at least one sequence specific to COVID-19 needs to be configured. When three targets are set, positive for COVID-19 can be diagnosed only when all three genes are detected, so that the reliability is increased. In this experiment, the E gene was set as a gene conserved in the beta-coronavirus family to which COVID-19 belonged, and the RdRP and N2 genes were sequences that existed only specifically for COVID-19, which were used as confirmative analysis.

Here, when the target sequence of COVID-19 cDNA was N2, a 2019-nCoV_N2 primer set (CDC, U.S.) was used, and a target single sequence was a sequence of SEQ ID NO: 17 consisting of 67 mer. The reverse primer attached to the magnetic nanoparticles used a modified reverse primer with a processed 5' end, and had aa sequence of SEQ ID NO: 3. In nSLAM, a forward primer reacting with a complementary single sequence of the target single sequence in an aqueous solution consisted of a sequence of SEQ ID NO: 12.

When the target sequence of cDNA was E, an RdRP_SARSr primer set (Charitt, Germany) was used, and the target single sequence was a sequence of SEQ ID NO: 18 consisting of 113 mer. The reverse primer attached to the magnetic nanoparticles used a modified reverse primer with a processed 5' end, and had a sequence of SEQ ID NO: 2. In nSLAM, a forward primer reacting with a complementary single sequence of the target single sequence in an aqueous solution consisted of a sequence of SEQ ID NO: 11.

For the N2 and E targets, the number of nSLAM cycles was simplified to 3, 5, 10, 15, 25, and 35 times, and 5 μL of the functionalized magnetic nanoparticles were added to 42 PCR tubes (21 magnetic nanoparticles attached with modified reverse primers of the N2 gene and 21 magnetic nanoparticles attached with modified reverse primers of the E gene), respectively. Except for 3 N2 detection tubes and 3 E detection tubes, respectively, reagents were added to the remaining 36 tubes in the same manner as in nSLAM performed on the RdRP target. 18 N2 detection tubes and 18 E detection tubes were grouped into 3 tubes each (6 sets of N2 detection tube groups, 6 sets of E detection tube groups), and the number of nSLAM cycles was varied for each set. The nSLAM cycles for each of the 6 sets of the N2 detection tube groups and the E detection tube groups were set to 3 times, 5 times, 10 times, 15 times, 25 times, and 35 times. After the solutions in the tubes were sufficiently mixed, nSLAM amplification was performed. Initial denaturation (95° C.) was performed once for 30 seconds, and the nSLAM cycles were performed 3 to 35 times by setting denaturation (94° C.) for 15 seconds, annealing (53° C.) for 30 seconds, and extension (68° C.) for 1 minute and then terminated at 4° C. In order to maintain a uniform dispersion of particles during the nSLAM process, in a third cycle for a sample with a total number of 5 nSLAM cycles, a fifth cycle for a sample with 10 nSLAM cycles, an eighth cycle for a sample with 15 nSLAM cycles, a 13-th cycle for a sample with 25 nSLAM cycles, and a 18-th cycle for a sample with 35 nSLAM cycles, at 55 seconds of the extension step, the tube was taken out and sonicated for 30 seconds, and then nSLAM was performed again.

After the nSLAM process, the washing process and the electrochemical detection process for the solution were performed in the same manner as in other examples.

As a result of the measurement, the threshold was exceeded from 3.9 nSLAM cycles for the N2 target and 3.4 nSLAM cycles for the E target.

Through this, it was confirmed that the minimum number of detectable nSLAM cycles for all detection targets (N2, E, RdRP sequences) was 4 times. In the case of the conventional molecular diagnosis, the PCR cycle was set to 35 to 40 cycles on average, and the required time was about 3 hours, so that most of the time of diagnosis was consumed in the PCR step. In comparison, the present disclosure can shorten the nSLAM cycle to 4 times and significantly reduce the required time to about 7.5 minutes, so that it can be expected to enable rapid on-site diagnosis required in the actual field where virus-derived infectious diseases occur.

FIGS. 15 and 16 are diagrams illustrating changes in DPV electrochemical signals according to the number of nSLAM cycles while a concentration of the COVID-19 cDNA of the target sequence is uniformly maintained, when PCR was performed on N2, E, and RdRP base sequences of a COVID-19 genetic material in Experimental Example.

FIG. 15A illustrates average peak current values of the electrochemical signal after each nSLAM cycle at a 1 fM cDNA concentration for the RdRP base sequence, and it has been confirmed that the minimum number of detectable nSLAM cycles is 3 times (required about 75 minutes).

FIG. 15B illustrates average peak current values of the electrochemical signal after each nSLAM cycle at a 1 fM cDNA concentration for the E base sequence, and it has been confirmed that the minimum number of detectable nSLAM cycles is 3.4 times (required about 6.3 minutes).

FIG. 15C illustrates average peak current values of the electrochemical signal after each nSLAM cycle at a 1 fM cDNA concentration for the N2 base sequence, and it has been confirmed that the minimum number of detectable nSLAM cycles is 3.9 times (required about 7.3 minutes).

FIG. 16 is a diagram illustrating comparing data near a threshold after processing electrochemical measurement values through non-linear regression after each nSLAM cycle at a 1 fM cDNA concentration on N2, E, and RdRP base sequences. Threshold values for each target were individually indicated, and the minimum number of detectable nSLAM cycles for all targets was found as 4 (required about 7.5 minutes).

Comparative Example 1

An experiment was performed to confirm the efficiency of attaching a sequence of a reverse primer to the surface of magnetic nanoparticles. nSLAM was performed by attaching a sequence of a forward primer, not the sequence of the reverse primer, to the surface of the magnetic nanoparticles, and the difference in current signal was compared. The detection target was set to an RdRP gene sequence.

First, cDNA to be used for molecular diagnosis nSLAM was prepared in the same manner as in Example above. As the magnetic nanoparticles, magnetic nanoparticles attached with a modified reverse primer prepared in Preparation Example and magnetic nanoparticles attached with a modified forward primer were prepared.

For the forward primer, a modified forward primer was prepared by processing the 5' end to attach to the surface of the magnetic nanoparticles. For the processing of the forward primer, an A15 spacer and a thiol group were attached to a 5' end of an RdRP_SARSr forward primer in the same manner as in Preparation Example, and a single strand of a sequence of SEQ ID NO: 4 was prepared. This single sequence was attached to the surface of the magnetic nanoparticles in the same manner as in Preparation Example. Additionally, unmodified forward and reverse primers were also prepared for the nSLAM reaction to proceed together, and the base sequence of the reverse primer was a sequence of SEQ ID NO: 7 (RdRP_SARSr reverse primer).

In order to compare the electrochemical signals of the modified forward primer-attached magnetic nanoparticles and the modified reverse primer-attached magnetic nanoparticles, cDNA was prepared by diluting 10-25 M, 10-19 M, 10-16 M and 10-19 M concentrations.

5 µL of the modified reverse primer-attached magnetic nanoparticles were added in 15 PCR tubes. In 12 tubes except three PCR tubes, 24.8 µL of UPW, 5 µL of a 10× High Fidelity PCR buffer, 1 µL of a 10 mM dNTP mix, 2 µL of 50 mM MgSO$_4$, 0.2 µL of Platinum Taq DNA Polymerase High Fidelity (5 U/µL), and 10 µL of a 100 µM forward primer (SEQ ID NO: 10) were added, respectively, and then the 12 tubes were bundled by three (a total of 4 sets), and 2 µL of each cDNA at a different concentration was added for each group. After the solutions were sufficiently mixed, nSLAM amplification was performed for 12 tubes. Initial denaturation (95° C.) was performed once for 30 seconds, and the nSLAM cycles were performed 35 times by setting denaturation (94° C.) for 15 seconds, annealing (53° C.) for 30 seconds, and extension (68° C.) for 1 minute and then terminated at 4° C. In order to maintain a uniform dispersion of particles during the nSLAM process, the tubes were taken out when the extension of the 18-th cycle elapsed 55 seconds during the nSLAM cycles and sonicated for 30 seconds, and then nSLAM was performed again.

After completion of nSLAM, the washing process for extracting the nSLAM amplified product and the electrochemical signal detection process were performed in the same manner as in the above Example.

5 µL of the modified forward primer-attached magnetic nanoparticles were added in 15 PCR tubes. In 12 tubes except three PCR tubes, 24.8 µL of UPW, 5 µL of a 10× High Fidelity PCR buffer, 1 µL of a 10 mM dNTP mix, 2 µL of 50 mM MgSO$_4$, 0.2 µL of Platinum Taq DNA Polymerase High Fidelity (5 U/µL), and 10 µL of a 100 µM forward primer (SEQ ID NO: 7) were added, respectively, and then the 12 tubes were bundled by three (a total of 4 sets), and 2 µL of each cDNA at a different concentration ($10^{-25}$ M, $10^{-19}$ M, $10^{-16}$ M, and $10^{-19}$ M) was added for each group. After sufficiently mixing the solution, nSLAM amplification was performed for 12 tubes, and nSLAM setting, washing process after nSLAM, electrochemical signal measurement and data arrangement were performed in the same manner as the reverse primer.

As a result of the two experiments, it was confirmed that the average current values of the modified reverse primer-attached magnetic nanoparticles were entirely higher, and the signal difference was larger as the cDNA concentration increased. In addition, the average current signal values of the modified reverse primer-attached magnetic nanoparticles exceeded the threshold for the concentration section of 10-19 M cDNA or more, but in the case of the modified forward primer-attached magnetic nanoparticles, the threshold was higher than that of the reverse primer and the average current values were entirely lower, so that the threshold cannot be exceeded at a concentration of 10-19 M cDNA or less. That is, when the modified reverse primer-attached magnetic nanoparticles were used at the same target genetic material concentration, the electrochemical signal current value was higher and the cDNA concentration section exceeding the threshold was wider. Accordingly, it is meant that detection is enabled even at a lower concentration than when the modified forward primer-attached magnetic nanoparticles were used. Through this, it can be confirmed that the sensitivity of the detection system can be further improved when the nSLAM is performed using the modified reverse primer-attached magnetic nanoparticles.

FIG. 17 illustrates average peak current values obtained through electrochemical measurement after performing the above experiment. An error bar indicates the standard deviation of the current values for each sample. A blue dotted line and an orange dotted line represent thresholds calculated based on average peak current values of a control sample of the modified reverse primer-attached magnetic nanoparticles and a control sample of the modified forward primer-attached magnetic nanoparticles, respectively. Overall, the current values of the nSLAM samples of the reverse primer were higher, a slope of a best fit line was larger, and all the current values in the measured cDNA concentration section exceeded the threshold.

Comparative Example 2

Specificity for COVID-19 was tested to determine whether other genetic materials may have an effect in the case of diagnosing Coronavirus using Example of the present disclosure.

As a negative control target, MERS-CoV and HCoV-OC43 belonging to the same beta virus family as COVID-19 were selected. The two targets were received from the National Culture Collection for Pathogens (NCCP). All targets are semi-clinical samples taken from actual infected people, and for each target, the nSLAM process is performed with modified reverse primer-attached magnetic nanoparticles of N2, E, and RdRP genes. Synthesis of cDNA of each RNA genetic material was prepared in the same manner as in Examples. 5 μL of modified reverse primer-attached magnetic nanoparticles of N2, E, and RdRP genes prepared in Preparation Example were added to 36 PCR tubes (each 12 tubes), respectively. Except for 3 tubes for N2 detection, 3 tubes for E detection, and 3 tubes for RdRP detection, PCR reagents were added to the remaining 27 tubes in the same manner as in Example. However, among 9 N2, E and RdRP samples, 3 samples were injected with SARS-CoV-2 (COVID-19) cDNA, 3 samples were injected with MERS-CoV cDNA, and the remaining 3 samples were injected with HCoV-OC43 cDNA, respectively.

nSLAM was performed in the same manner as in Example for 27 samples to which the PCR reagent was added. Initial denaturation (95° C.) was performed once for 30 seconds, and the nSLAM cycles were performed 35 times by setting denaturation (94° C.) for 15 seconds, annealing (53° C.) for 30 seconds, and extension (68° C.) for 1 minute and then terminated at 4° C. In order to maintain a uniform dispersion of particles during the nSLAM process, the tubes were taken out when the extension of the 18-th cycle elapsed 55 seconds during the nSLAM cycles and sonicated for 30 seconds, and then nSLAM was performed again.

After completion of nSLAM, the washing process for extracting the nSLAM amplified product and the electrochemical signal specification were performed in the same manner as in Examples.

As a result of the measurement, only a COVID-19 Wild-Type RNA (hereafter, SARS-CoV-2 RNA) target for all sequence targets specifically exceeded the threshold, and for MERS-CoV and HCOV-OC43, signals of all amplified base sequences did not exceed the threshold. As a result, it can be confirmed that the COVID-19 molecular diagnostic system using the present disclosure specifically causes gene amplification only for the COVID-19 genetic material.

FIG. 18 illustrates a result of the above experiment, showing the specificity for a COVID-19 model. The dotted lines indicate thresholds calculated using an electrochemical signal of a sample (control sample) without performing nSLAM with modified reverse primer-attached magnetic nanoparticles of each gene sequence (N2, E, RdRP base sequences). For all types of gene sequences, current values exceeding a threshold were measured only in a sample injected with a SARS-CoV-2 target.

FIG. 19 is an image obtained by electrophoresis after PCR is performed to confirm that there is a cross-reaction with genes other than SARS-CoV-2. For gene materials other than SARS-CoV-2, it can be confirmed that almost no band was formed, and a cross-reaction does not occur with other gene materials like the electrochemical signal measurement result.

Those skilled in the art will be able to understand that the present disclosure can be easily executed in other detailed forms without changing the technical spirit or an essential feature thereof. Therefore, it should be appreciated that the embodiments described above are illustrative in all aspects and are not restricted. The scope of the present disclosure is represented by claims to be described below rather than the detailed description, and it is to be interpreted that the meaning and scope of the claims and all the changes or modified forms derived from the equivalents thereof come within the scope of the present disclosure.

What is claimed is:

1. A kit for detecting coronavirus comprising:
magnetic nanoparticles and primers attached to a surface of the magnetic nanoparticles,
wherein the primers form amplified products through a polymerase chain reaction with the coronavirus, and the magnetic nanoparticles detect the coronavirus by amplifying an electrochemical signal by a repeated potential application, and
wherein the primers include any one or more of SEQ ID NO: 1 to SEQ ID NO: 6.

2. The kit for detecting the coronavirus of claim 1, wherein the electrochemical signal measures a change in current value by applying DC or AC power.

3. The kit for detecting the coronavirus of claim 1, wherein the coronavirus is any one or more of HCoV-229E, HCoV-OC43, SARS-CoV, HCoV-NL63, HCoV-HKU1, MERS-COV, and COVID-19 (SARS-CoV-2).

4. The kit for detecting the coronavirus of claim 1, wherein the magnetic nanoparticles include a magnetic nanoparticle comprising a core portion comprising iron oxide and a shell portion comprising gold provided to surround the core portion, and
the primers are modified with a compound having any one of a thiol group and an amino group at a 5'-end.

5. The kit for detecting the coronavirus of claim 4, wherein an average diameter of the magnetic nanoparticles is provided with a first length and an average thickness of the shell portion is provided with a second length, wherein the second length is 0.09 to 0.15 times the first length.

6. The kit for detecting the coronavirus of claim 4, wherein an average diameter of the magnetic nanoparticles is provided with a first length and an average thickness of the shell portion is provided with a second length, wherein the first length is 170 nm to 300 nm and the second length is 15 nm to 40 nm.

7. The kit for detecting the coronavirus of claim 4, wherein the magnetic nanoparticles are prepared by preparing the core portion made of the iron oxide,
providing a buffer portion containing silicon on a surface of the core portion, and functionalizing an outer surface of the buffer portion with at least one of an amino group (—$NH_2$) or a thiol group (—SH) and then forming the shell portion containing the gold.

8. The kit for detecting the coronavirus of claim 1, further comprising:
a reactor having an opening on one side;
a conductive substrate provided to cover the opening of the reactor;
a first electrode and a second electrode provided in the reactor;
and
a potentiostat for measuring the electrochemical signal using the conductive substrate and the first and second electrodes as a three-electrode module.

9. The kit for detecting the coronavirus of claim 8, wherein the magnetic nanoparticles and the amplified products formed on the surface of the magnetic nanoparticles are provided in the reactor, and
the first electrode includes a reference electrode, the conductive substrate includes a working electrode, and the second electrode includes a counter electrode controlling an electron balance generated from the reference electrode and the working electrode,
wherein the first electrode or the second electrode consists of any one or more of gold (Au), cobalt (Co), platinum (Pt), silver (Ag), carbon nanotube, graphene, and carbon, and
the conductive substrate includes any one or more of indium tin oxide (ITO), ZnO, $SnO_2$, $In_2O_3$, $CdSnO_4$, a carbon substrate material including carbon nanotubes, a fluorine-doped tin oxide (FTO), and an aluminum doped zinc oxide (AZO).

10. The kit for detecting the coronavirus of claim 8, wherein the potentiostat includes any one or more of a differential pulse voltammeter (DPV), an anodic stripping voltammeter (ASV), a chronoamperometer (CA), a cyclic voltammeter, a square wave voltammeter (SWV), and an impedance meter.

11. The kit for detecting the coronavirus of claim 8, wherein when a magnetic field is reversibly applied into the reactor one or more times with the conductive substrate interposed therebetween,
the magnetic nanoparticles move toward the opening of the reactor.

12. The kit for detecting the coronavirus of claim 8, wherein the first electrode is a reference electrode containing Ag/AgCl, the second electrode is a counter electrode containing Pt, and the conductive substrate is a working electrode containing ITO, and
the measuring of the electrochemical signal includes a differential pulse voltammetry (DPV).

* * * * *

SEQUENCE LISTING

```
Sequence total quantity: 18
SEQ ID NO: 1            moltype = DNA  length = 37
FEATURE                 Location/Qualifiers
source                  1..37
                        mol_type = genomic DNA
                        organism = unidentified
SEQUENCE: 1
aaaaaaaaaa aaaaagtgar atggtcatgt gtggcgg                                37
```

-continued

```
SEQ ID NO: 2               moltype = DNA   length = 41
FEATURE                    Location/Qualifiers
source                     1..41
                           mol_type = genomic DNA
                           organism = unidentified
SEQUENCE: 2
aaaaaaaaaa aaaaaacagg tacgttaata gttaatagcg t                              41

SEQ ID NO: 3               moltype = DNA   length = 35
FEATURE                    Location/Qualifiers
source                     1..35
                           mol_type = genomic DNA
                           organism = unidentified
SEQUENCE: 3
aaaaaaaaaa aaaaattaca aacattggcc gcaaa                                     35

SEQ ID NO: 4               moltype = DNA   length = 41
FEATURE                    Location/Qualifiers
source                     1..41
                           mol_type = genomic DNA
                           organism = unidentified
SEQUENCE: 4
aaaaaaaaaa aaaaacarat gttaaasaca ctattagcat a                              41

SEQ ID NO: 5               moltype = DNA   length = 37
FEATURE                    Location/Qualifiers
source                     1..37
                           mol_type = genomic DNA
                           organism = unidentified
SEQUENCE: 5
aaaaaaaaaa aaaaatatt gcagcagtac gcacaca                                    37

SEQ ID NO: 6               moltype = DNA   length = 33
FEATURE                    Location/Qualifiers
source                     1..33
                           mol_type = genomic DNA
                           organism = unidentified
SEQUENCE: 6
aaaaaaaaaa aaaagcgcg acattccgaa gaa                                        33

SEQ ID NO: 7               moltype = DNA   length = 22
FEATURE                    Location/Qualifiers
source                     1..22
                           mol_type = genomic DNA
                           organism = unidentified
SEQUENCE: 7
gtgaratggt catgtgtggc gg                                                   22

SEQ ID NO: 8               moltype = DNA   length = 26
FEATURE                    Location/Qualifiers
source                     1..26
                           mol_type = genomic DNA
                           organism = unidentified
SEQUENCE: 8
acaggtacgt taatagttaa tagcgt                                               26

SEQ ID NO: 9               moltype = DNA   length = 20
FEATURE                    Location/Qualifiers
source                     1..20
                           mol_type = genomic DNA
                           organism = unidentified
SEQUENCE: 9
ttacaaacat tggccgcaaa                                                      20

SEQ ID NO: 10              moltype = DNA   length = 26
FEATURE                    Location/Qualifiers
source                     1..26
                           mol_type = genomic DNA
                           organism = unidentified
SEQUENCE: 10
caratgttaa asacactatt agcata                                               26

SEQ ID NO: 11              moltype = DNA   length = 22
FEATURE                    Location/Qualifiers
source                     1..22
                           mol_type = genomic DNA
                           organism = unidentified
SEQUENCE: 11
```

```
atattgcagc agtacgcaca ca                                              22

SEQ ID NO: 12          moltype = DNA   length = 18
FEATURE                Location/Qualifiers
source                 1..18
                       mol_type = genomic DNA
                       organism = unidentified
SEQUENCE: 12
gcgcgacatt ccgaagaa                                                   18

SEQ ID NO: 13          moltype = DNA   length = 101
FEATURE                Location/Qualifiers
source                 1..101
                       mol_type = genomic DNA
                       organism = unidentified
SEQUENCE: 13
gtgaaatggt catgtgtggc ggttcactat atgttaaacc aggtggaacc tcatcaggag     60
atgccacaac tgcttatgct aatagtgttt taacatttg t                         101

SEQ ID NO: 14          moltype = DNA   length = 113
FEATURE                Location/Qualifiers
source                 1..113
                       mol_type = genomic DNA
                       organism = unidentified
SEQUENCE: 14
acaggtacgt taatagttaa tagcgtactt cttttcttg ctttcgtggt attcttgcta      60
gttacactag ccatccttac tgcgcttcga ttgtgtgcgt actgctgcaa tat           113

SEQ ID NO: 15          moltype = DNA   length = 67
FEATURE                Location/Qualifiers
source                 1..67
                       mol_type = genomic DNA
                       organism = unidentified
SEQUENCE: 15
ttacaaacat tggccgcaaa ttgcacaatt tgccccagc gcttcagcgt tcttcggaat      60
gtcgcgc                                                               67

SEQ ID NO: 16          moltype = DNA   length = 15
FEATURE                Location/Qualifiers
source                 1..15
                       mol_type = unassigned DNA
                       organism = unidentified
SEQUENCE: 16
aaaaaaaaaa aaaaa                                                      15

SEQ ID NO: 17          moltype = DNA   length = 67
FEATURE                Location/Qualifiers
source                 1..67
                       mol_type = genomic DNA
                       organism = unidentified
SEQUENCE: 17
gcgcgacatt ccgaagaacg ctgaagcgct gggggcaaat tgtgcaattt gcggccaatg     60
tttgtaa                                                               67

SEQ ID NO: 18          moltype = DNA   length = 113
FEATURE                Location/Qualifiers
source                 1..113
                       mol_type = genomic DNA
                       organism = unidentified
SEQUENCE: 18
atattgcagc agtacgcaca caatcgaagc gcagtaagga tggctagtgt aactagcaag     60
aataccacga aagcaagaaa aagaagtacg ctattaacta ttaacgtacc tgt           113
```